United States Patent [19]
Makino

[11] Patent Number: 5,999,962
[45] Date of Patent: Dec. 7, 1999

[54] DIVIDER WHICH ITERATIVELY MULTIPLIES DIVISOR AND DIVIDEND BY MULTIPLIERS GENERATED FROM THE DIVISORS TO COMPUTE THE INTERMEDIATE DIVISORS AND QUOTIENTS

[75] Inventor: Hiroshi Makino, Tokyo, Japan

[73] Assignee: Mitsubishi Denki Kabushiki Kaisha, Tokyo, Japan

[21] Appl. No.: 08/801,133

[22] Filed: Feb. 14, 1997

[30] Foreign Application Priority Data

Oct. 4, 1996  [JP]  Japan ..................................... 8-264902

[51] Int. Cl.$^6$ ....................................................... G06F 7/52
[52] U.S. Cl. ........................... 708/654; 708/493; 708/656
[58] Field of Search ................................... 364/761, 765, 364/766, 724.19, 767, 724; 708/653, 654, 655, 656, 650, 651, 652, 493

[56] References Cited

U.S. PATENT DOCUMENTS

| | | | |
|---|---|---|---|
| 3,508,038 | 4/1970 | Goldschmidt et al. | 708/654 |
| 3,828,175 | 8/1974 | Amdalh et al. | 708/654 |
| 4,707,798 | 11/1987 | Nakano | 364/675 |
| 4,866,655 | 9/1989 | Nishiiyama et al. | 364/761 |
| 4,941,118 | 7/1990 | Yamazaki et al. | 364/761 |
| 5,046,038 | 9/1991 | Briggs et al. | 708/654 |
| 5,128,891 | 7/1992 | Lynch et al. | 364/767 |
| 5,177,703 | 1/1993 | Mori | 364/767 |
| 5,307,303 | 4/1994 | Briggs et al. | 708/654 |
| 5,309,385 | 5/1994 | Okamoto | 364/761 |
| 5,784,307 | 5/1996 | Sheaffer | 364/766 |

FOREIGN PATENT DOCUMENTS

| | | |
|---|---|---|
| 62-86434 | 4/1987 | Japan . |
| 1-161437 | 6/1989 | Japan . |
| 1-321517 | 12/1989 | Japan . |

*Primary Examiner*—Joseph E. Palys
*Assistant Examiner*—Rijue Mai
*Attorney, Agent, or Firm*—Burns, Doane, Swecker & Mathis, LLP

[57] ABSTRACT

A divider which multiplies both divisor and dividend by a first multiplier generated from the divisor to compute an intermediate divisor and an intermediate quotient, and iterates such computations by the number of times needed, so that the intermediate divisor approaches a predetermined value, and the intermediate quotient approaches the quotient obtained by dividing the dividend by the divisor. This makes it possible to implement a fast divider with a configuration simpler than that of a conventional divider which feeds back the outputs of multipliers many times depending on the accuracy required, which involves delay times in the multiplication and makes the configuration complicated.

18 Claims, 14 Drawing Sheets

| CASE | $a_0$ | $a_1$ | $a_2$ | $a_3$ | $m_0$ | $m_1$ | $m_2$ |
|---|---|---|---|---|---|---|---|
| 1 | 1 | 0 | 0 | 0 | 1 | 0 | 0 |
| 2 | 1 | 0 | 0 | 1 | 1 | 0 | 0 |
| 3 | 1 | 0 | 1 | 0 | 1 | 0 | -1 |
| 4 | 1 | 0 | 1 | 1 | 1 | 0 | -1 |
| 5 | 1 | 1 | 0 | 0 | 1 | 0 | -1 |
| 6 | 1 | 1 | 0 | 1 | 1 | -1 | 0 |
| 7 | 1 | 1 | 1 | 0 | 1 | -1 | 0 |
| 8 | 1 | 1 | 1 | 1 | 1 | -1 | 0 |

FIG. 4

| CASE | $a_0$ | $a_1$ | $a_2$ | $a_3$ | $c_0$ | $c_1$ | $c_2$ | $c_3$ | $c_4$ | $c_5$ | $c_6$ | $c_7$ | $c_8$ | $c_9$ |
|---|---|---|---|---|---|---|---|---|---|---|---|---|---|---|
| 1 | 1 | 0 | 0 | 0 | 1 | 0 | 0 | 0 | $a_4$ | $a_5$ | $a_6$ | $a_7$ | 0 | 0 |
| 2 | 1 | 0 | 0 | 1 | 1 | 0 | 0 | 1 | $a_4$ | $a_5$ | $a_6$ | $a_7$ | 0 | 0 |
| 3 | 1 | 0 | 1 | 0 | 1 | 0 | 0 | 0 | $a_4-a_2$ | $a_5-a_3$ | $a_6-a_4$ | $a_7-a_5$ | $-a_6$ | $-a_7$ |
| 4 | 1 | 0 | 1 | 1 | 1 | 0 | 0 | 1 | $a_4-a_2$ | $a_5-a_3$ | $a_6-a_4$ | $a_7-a_5$ | $-a_6$ | $-a_7$ |
| 5 | 1 | 1 | 0 | 0 | 1 | 0 | 0 | 1 | $a_4-a_2$ | $a_5-a_3$ | $a_6-a_4$ | $a_7-a_5$ | $-a_6$ | $-a_7$ |
| 6 | 1 | 1 | 0 | 1 | 1 | 0 | 0 | $-1$ | $a_4-a_3$ | $a_5-a_4$ | $a_6-a_5$ | $a_7-a_6$ | $-a_7$ | 0 |
| 7 | 1 | 1 | 1 | 0 | 1 | 0 | 0 | $-1$ | $a_4-a_3$ | $a_5-a_4$ | $a_6-a_5$ | $a_7-a_6$ | $-a_7$ | 0 |
| 8 | 1 | 1 | 1 | 1 | 1 | 0 | 0 | 0 | $a_4-a_3$ | $a_5-a_4$ | $a_6-a_5$ | $a_7-a_6$ | $-a_7$ | 0 |

FIG. 5

FIG. 5(a) case 3
```
  1  0  1  0  ···
-       1  0  1  0  ···
─────────────────────
  1  0  0  1  ···
```

FIG. 5(b) case 4
```
  1  0  1  1  ···
-       1  0  1  1  ···
─────────────────────
  1  0  0  1  ···
```

FIG. 5(c) case 5
```
  1  1  0  0  ···
-       1  1  0  0  ···
─────────────────────
  1  1 -1 -1  ···
        ↓
  1  0  0  1  ···
```

FIG. 5(d) case 6
```
  1  1  0  1  ···
-       1  1  0  1  ···
─────────────────────
  1  0 -1  1  ···
        ↓
  1  0  0 -1  ···
```

FIG. 5(e) case 7
```
  1  1  1  0  ···
-       1  1  1  0  ···
─────────────────────
  1  0  0 -1  ···
```

FIG. 5(f) case 8
```
  1  1  1  1  ···
-       1  1  1  1  ···
─────────────────────
  1  0  0  0  ···
```

| CASE | $a_0$ | $a_1$ | $a_2$ | $a_3$ | $d_0$ | $d_1$ | $d_2$ | $d_3$ | $d_4$ | $d_5$ | $d_6$ | $d_7$ | $d_8$ | $d_9$ |
|---|---|---|---|---|---|---|---|---|---|---|---|---|---|---|
| 1 | 1 | 0 | 0 | 0 | 1 | $b_1$ | $b_2$ | $b_3$ | $b_4$ | $b_5$ | $b_6$ | $b_7$ | 0 | 0 |
| 2 | 1 | 0 | 0 | 1 | 1 | $b_1$ | $b_2$ | $b_3$ | $b_4$ | $b_5$ | $b_6$ | $b_7$ | 0 | 0 |
| 3 | 1 | 0 | 1 | 0 | 1 | $b_1$ | $b_2-1$ | $b_3-b_1$ | $b_4-b_2$ | $b_5-b_3$ | $b_6-b_4$ | $b_7-b_5$ | $-b_6$ | $-b_7$ |
| 4 | 1 | 0 | 1 | 1 | 1 | $b_1$ | $b_2-1$ | $b_3-b_1$ | $b_4-b_2$ | $b_5-b_3$ | $b_6-b_4$ | $b_7-b_5$ | $-b_6$ | $-b_7$ |
| 5 | 1 | 1 | 0 | 0 | 1 | $b_1$ | $b_2-1$ | $b_3-b_1$ | $b_4-b_2$ | $b_5-b_3$ | $b_6-b_4$ | $b_7-b_5$ | $-b_6$ | $-b_7$ |
| 6 | 1 | 1 | 0 | 1 | 1 | $b_1-1$ | $b_2-b_1$ | $b_3-b_2$ | $b_4-b_3$ | $b_5-b_4$ | $b_6-b_5$ | $b_7-b_6$ | $-b_7$ | 0 |
| 7 | 1 | 1 | 1 | 0 | 1 | $b_1-1$ | $b_2-b_1$ | $b_3-b_2$ | $b_4-b_3$ | $b_5-b_4$ | $b_6-b_5$ | $b_7-b_6$ | $-b_7$ | 0 |
| 8 | 1 | 1 | 1 | 1 | 1 | $b_1-1$ | $b_2-b_1$ | $b_3-b_2$ | $b_4-b_3$ | $b_5-b_4$ | $b_6-b_5$ | $b_7-b_6$ | $-b_7$ | 0 |

DIVIDER WHICH ITERATIVELY MULTIPLIES DIVISOR AND DIVIDEND BY MULTIPLIERS GENERATED FROM THE DIVISORS TO COMPUTE THE INTERMEDIATE DIVISORS AND QUOTIENTS

BACKGROUND OF THE INVENTION

1. Field of the Invention

The present invention relates to a divider for carrying out division using a semiconductor integrated circuit, and particularly to a divider capable of fast division.

2. Description of Related Art

Recently, computer graphics techniques have been flourishing with the increase in the performance of computers. Since the computer graphics requires enormous amount of numerical computation, extremely fast numerical processing is needed to implement it. In particular, since the computer graphics carries out division much more frequently than ordinary numerical processing, it requires much faster division by hardware instead of software which is usually employed to carry out division in a comparatively large amount of time.

FIG. 19 is a block diagram showing a conventional divider implemented by hardware, which is disclosed in JP-A 1-321517 (1989). In this figure, the reference numeral 123 designates a memory such as a ROM, 125, 126, 127 and 128 designate first, second, third and fourth data bus selectors (MUX), 133 and 134 designate first and second multipliers, 137 designates a two's complementer, and 139 designates an adder.

Its operation will be described. The divider obtains the quotient $b_i/a_i$ by sequentially multiplying both the dividend $b_i$ and the divisor $a_i$ by the same values such that the product of the divisor $a_i$ and these values converge to one. This method is called multiply convergence division, or reciprocal approximate division.

The memory 123 inputs a divisor 1 ($a_i$) as an address input, and outputs an approximate value of a reciprocal of the divisor 1. The first data bus selector 125 inputs the output 124 of the memory 123 and the output 138 of the two's complementer 137; the second data bus selector 126 inputs the divisor, the output 135 of the first multiplier 133 and the output 136 of the second multiplier 134; the third data bus selector 127 inputs the output 124 of the memory 123 and the output 138 of the two's complementer 137; and the fourth data bus selector 128 inputs the dividend, and the output 136 of the second multiplier 134. The first multiplier 133 inputs the output 129 of the first data bus selector 125 as a first input, and the output 130 of the second data bus selector 126 as a second input, and supplies their product to the second data bus selector 126, the two's complementer 137 and the adder 139. The second multiplier 134 inputs the output 131 of the third data bus selector 127 as a first input, and the output 132 of the fourth data bus selector 128 as a second input, and supplies their product to the second data bus selector 126, the fourth data bus selector 128, and the adder 139. The adder 139 outputs the sum of the outputs of the first and second multipliers 133 and 134 as the quotient.

The conventional divider with such an arrangement has the following problems.

1. The first and second multipliers each have an m×m/2 bit structure each, and carry out the multiplication of that scale for each loop of the computation, resulting in rather large delay times. Usually, the multiplier forms a plurality of partial products from a multiplier and a multiplicand, adds the partial products by adders such as carry save adders until the partial products are reduced to two, and finally adds the two partial products by an adder like a ripple carry adder, thereby completing the multiplication. To improve the speed of the multiplication, various ideas are proposed such as reduction in the number of partial products by using the Booth algorithm, fast summing up of the partial products by the Wallace tree, and fast final addition by a carry lookahead adder.

The delay times of the first and second multipliers, however, are still large even if these methods are used. Accordingly, it is unavoidable that the conventional divider takes a substantial delay time proportional to the number of multiplications. In other words, it takes a long division time due to the delay of the multipliers when using the conventional divider including the common multipliers.

2. The division time further increases owing to the two's complementer which is passed through for each computing loop. This is because the two's complementer includes a kind of an adder, and the delay time due to the adder is added to the delay of the multipliers. In addition, the two's complementer increases the amount of hardware.

3. Since the entire circuit is occupied throughout a division operation, the next computation cannot be started until that division has been completed. This makes it impossible to adopt the pipeline processing to increase the speed.

SUMMARY OF THE INVENTION

The present invention is achieved to solve the foregoing problems, having an object to propose a divider that implements fast division with a simple configuration.

According to a first aspect of the present invention, there is provided a divider inputting a dividend and a divisor and outputting a quotient, the divider comprising:

first computing means for computing a first intermediate divisor and a first intermediate quotient by multiplying the divisor and the dividend by a first multiplier, respectively, the first multiplier being generated from the divisor by the first computing means such that it includes a smaller number of bits than the divisor;

second computing means for computing a second intermediate divisor and a second intermediate quotient by multiplying the first intermediate divisor and the first intermediate quotient by a second multiplier, respectively, the second multiplier being generated from the first intermediate divisor by the second computing means such that it includes a smaller number of bits than the first intermediate divisor; and output means for outputting a latest intermediate quotient as the quotient.

Here, the divider may further comprise n-th computing means, where n is an integer equal to or greater than three, for computing an n-th intermediate divisor and an n-th intermediate quotient by multiplying an (n−1)-th intermediate divisor and an (n−1)-th intermediate quotient by an n-th multiplier, respectively, the n-th multiplier being generated from the (n−1)-th intermediate divisor by the n-th computing means such that it has a smaller number of bits than the (n−1)-th intermediate divisor, wherein the n varies from three to such a value that the n-th intermediate divisor approaches a predetermined value, and the n-th intermediate quotient approaches the quotient obtained by dividing the dividend by the divisor.

According to a second aspect of the present invention, there is provided a divider inputting a dividend and a divisor and outputting a quotient obtained by dividing the dividend by the divisor, the divisor having a value equal to or greater than one and less than two, the divider comprising:

a controller for producing a control signal from a first multiplier, the first multiplier being generated by the controller such that it consists of a predetermined number of upper digits of the divisor, the upper digits including or excluding a most significant digit of the divisor;

first multiplying means for obtaining a first intermediate divisor by multiplying the divisor by the first multiplier, the first intermediate divisor being represented in a redundant binary notation, and having an integer portion of unity and at least two consecutive zeros immediately after its radix point;

second multiplying means for obtaining a first intermediate quotient represented in the redundant binary notation by multiplying the dividend by the first multiplier;

third multiplying means for obtaining a second intermediate divisor by multiplying the first intermediate divisor by a second multiplier, the second multiplier being generated by the third multiplying means by extracting a plurality of upper digits from the first intermediate divisor and by inverting signs of third and fourth redundant binary digits after a radix point of the first intermediate divisor, and the second intermediate divisor being represented in the redundant binary notation including an integer portion of unity and at least three consecutive zeros immediately after its radix point;

fourth multiplying means for obtaining a second intermediate quotient represented in the redundant binary notation by multiplying the first intermediate quotient by the second multiplier;

f-th multiplying means, where f is an odd integer equal to or greater than five, for obtaining a third intermediate divisor by multiplying the second intermediate divisor by a third multiplier, the third multiplier being generated by the f-th multiplying means by extracting upper n digits from the second intermediate divisor having an integer portion of unity and m consecutive zeros immediately after its radix point, and by inverting signs of the redundant binary digits from an (m+1)-th place to (n−1)-th place after a radix point of the upper n digits extracted, where n is an integer equal to or greater than m+3 and equal to or less than 2m+1, and the third intermediate divisor being represented in the redundant binary notation including an integer portion of unity and (2m−1) consecutive zeros immediately after its radix point;

g-th multiplying means, where g is an even integer equal to or greater than six, for obtaining a third intermediate quotient represented in the redundant binary notation by multiplying the second intermediate quotient by the third multiplier;

h-th multiplying means, where h is an even integer equal to or greater than six, for obtaining an h-th intermediate quotient represented in the redundant binary notation by multiplying the third intermediate quotient by a fourth multiplier, the fourth multiplier being generated by the h-th multiplying means by extracting upper q digits from the third intermediate divisor having an integer portion of unity and p consecutive zeros immediately after its radix point, and by inverting signs of the redundant binary digits from a (p+1)-th place to (q−1)-th place of the upper q digits extracted, where q is equal to or greater than p+3 and equal to or less than 2p+1, wherein operations by the f-th multiplying means and the g-th multiplying means are iterated by a number of times needed to obtain the quotient with predetermined accuracy after operations by the first to fourth multiplying means, ending with an operation by the h-th multiplying means.

Here, the divider may further comprise a converter for converting the quotient represented in the redundant binary notation into a corresponding binary number to be output.

The controller may input a plurality of upper bits of the divisor ($a_i$), and carry out the following computations to generate the first multiplier ($c_i$):

$(c_i)=(a_i)$: when $1 \leq (a_i) < 5/4$ $(c_i)=(3/4) \times (a_i)$: when $5/4 \leq (a_i) < 13/8$ $(c_i)=(1/2) \times (a_i)$: when $13/8 \leq (a_i) < 2$ The first multiplying means may obtain the first intermediate divisor by subtracting from the divisor a value generated by shifting the divisor by a number of times needed for generating the at least two consecutive zeros immediately after the radix point of the first intermediate divisor.

The controller may input three bits of the divisor from a first place to a third place after the radix point, and output a signal commanding to set all bits of the divisor to zero, a signal commanding to shift the divisor toward a lower digit by one bit, and a signal commanding to shift the divisor toward the lower digit by two bits, and a signal indicating a value of a third place after the radix point of the first intermediate divisor represented in the redundant binary notation.

The first multiplying means may comprise a shifter for carrying out in response to the control signal one of operations of setting all bits of the divisor to zero, shifting the divisor by one bit toward a lower digit, and shifting the divisor by two bits toward the lower digit, to generate a fourth and successive digits of the first intermediate divisor represented in the redundant binary notation in response to the divisor and an output of the shifter.

The second multiplying means may comprise a shifter for carrying out in response to the control signal one of operations of setting all bits of the dividend to zero, shifting the dividend by one bit toward a lower digit, and shifting the dividend by two bits toward the lower digit, to generate the first intermediate quotient represented in the redundant binary notation in response to the dividend and an output of the shifter.

One of the third multiplying means and the f-th multiplying means may comprise two code inverters for generating two redundant binary numbers by code inverting one of the first intermediate divisor and the second intermediate divisor, and two redundant binary adders for adding code inverted redundant binary numbers and the intermediate divisor to output a redundant binary number.

One of the fourth multiplying means and the g-th multiplying means may comprise two code inverters for generating two redundant binary numbers by code inverting one of the first intermediate dividend and the second intermediate dividend, and two redundant binary adders for adding the two code inverted redundant binary numbers and the intermediate dividend to output a redundant binary number.

Each code inverter may comprise multiplexers, each for selecting one of pairs of elements of each digit of the redundant binary number input to the code inverter in response to a control signal represented in the redundant binary number.

Each redundant binary adder may comprise a plurality of adders, each of which adds a pair of corresponding digits of the two redundant binary numbers input to the redundant binary adder for outputting each digit of the output redundant binary number.

The dividend may be one, and the divider may output a reciprocal of the divisor as the quotient.

One of values (n-m-1) and (q-p-1) associated with the upper n digits of the second intermediate divisor and with the upper q digits of the third intermediate divisor, respectively, may be set at $2^a-1$, where a is a positive integer.

The divider may further comprise a multiplexer for selecting one of the intermediate divisors and a corresponding multiplier, and for selecting subsequently an output of multiplying means for multiplying the selected intermediate divisor by the corresponding multiplier, and a multiplexer for selecting one of the intermediate quotients corresponding to the multiplier, and for selecting subsequently an output of multiplying means for multiplying the selected intermediate quotient by the corresponding multiplier.

The divider may further comprise pipeline registers for temporarily storing a pair of the intermediate divisors and intermediate quotient, wherein the pipeline registers output the intermediate divisor and quotient which are temporarily stored in the pipeline registers to corresponding multiplying means under control of a clock signal.

According to a third aspect of the present invention, there is provided a divider inputting a dividend and a divisor and outputting a quotient obtained by dividing the dividend by the divisor, the divisor having a value equal to or greater than one and less than two, the divider comprising:

memory means for inputting a bit sequence as an address input and for outputting a first multiplier, the bit sequence consisting of a predetermined number of upper digits of the divisor, the upper digits including or excluding a most significant digit of the divisor;

first multiplying means for obtaining a first intermediate divisor by multiplying the divisor by the first multiplier, the first intermediate divisor being represented in a redundant binary notation, and having an integer portion of unity and at least r consecutive zeros immediately after its radix point, where r is a positive integer;

second multiplying means for obtaining a first intermediate quotient represented in the redundant binary notation by multiplying the dividend by the first multiplier;

t-th multiplying means, where t is an odd number equal to or greater than three, for obtaining a second intermediate divisor by multiplying the first intermediate divisor by a second multiplier, the second multiplier being generated by the t-th multiplying means by extracting s upper digits from the first intermediate divisor, where s is equal to or greater than r+3 and equal to or less than 2r+1, and by inverting signs of redundant binary digits from (r+1)-th place to (s−1)-th place after a radix point of the first intermediate divisor, and the second intermediate divisor being represented in the redundant binary notation including an integer portion of unity and at least (2r−1) consecutive zeros immediately after its radix point;

u-th multiplying means, where u is an even number equal to or greater than four, for obtaining a second intermediate quotient represented in the redundancy binary notation by multiplying the first intermediate quotient by the second multiplier; and y-th multiplying means, where y is an even integer equal to or greater than four, for obtaining a quotient represented in the redundant binary number by multiplying the second intermediate divisor by a third multiplier, the third multiplier being generated by the y-th multiplying means by extracting upper w digits from the second intermediate divisor having an integer portion of unity and v consecutive zeros immediately after its radix point, and by inverting signs of the redundant binary digits from a (v+1)-th place to (w−1)-th place after a radix point of the upper w digits extracted, where w is an integer equal to or greater than v+3 and equal to or less than 2v+1;

wherein operations by the t-th multiplying means and the u-th multiplying means are iterated by a number of times needed to obtain the quotient with predetermined accuracy after operations by the first and second multiplying means, ending with an operation by the y-th multiplying means.

BRIEF DESCRIPTION OF THE DRAWINGS

FIG. 4 is a diagram illustrating generation of intermediate divisors in a third embodiment of the divider in accordance with the present invention;

FIG. 5 is a diagram illustrating the generation processing of the intermediate divisors in the third embodiment;

DETAILED DESCRIPTION OF THE PREFERRED EMBODIMENTS

The invention will now be described with reference to the accompanying drawings.

Embodiment 1

Figure 1:
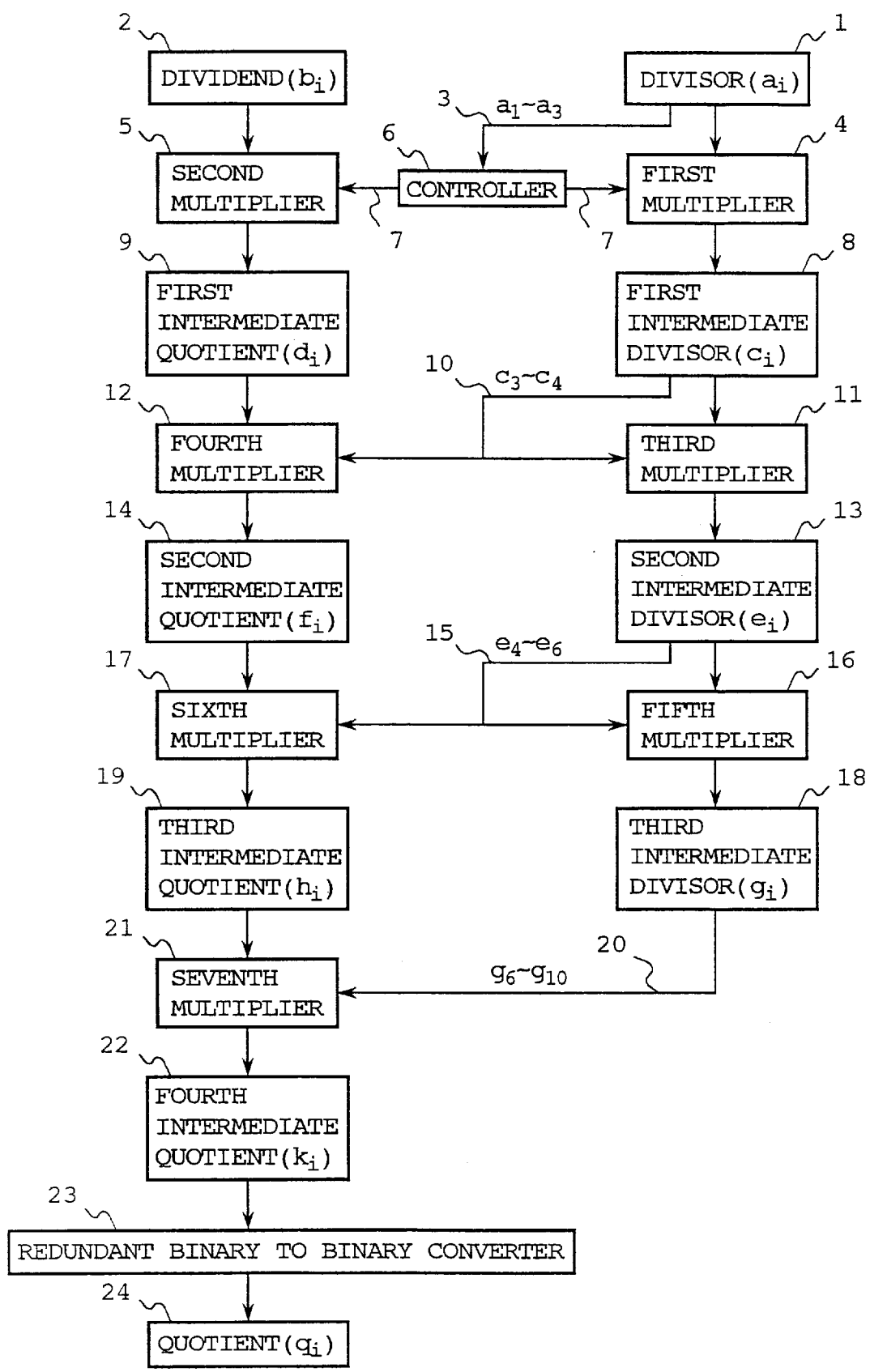
FIG. 1 is a block diagram showing a first embodiment of a divider in accordance with the present invention.

FIG. 1 is a block diagram showing an embodiment 1 of a divider in accordance with the present invention. In this figure, the reference numeral 1 designates a divisor ($a_i$), and 2 designates a dividend ($b_i$), both of which are a binary number of eight digits containing one integer digit and seven digits after the radix point. That is, $$(a_i)=a_0.a_1a_2a_3a_4a_5a_6a_7 \quad [1]$$

$$(b_i)=b_0.b_1b_2b_3b_4b_5b_6b_7 \quad [2]$$

In addition, it is assumed that the units place or the most significant digit is one. That is, $$a_o=1 \quad [3]$$

$$b_o=1 \quad [4]$$

Since the bit arrangement of a quotient does not change even if the radix point of the divisor and dividend is shifted in the division, equations [1]–[4] can be assumed without loss of generality. The reference numeral 3 designates a first multiplier ($a_1$–$a_3$) including leftmost three bits except for the most significant digit $a_o$ in the divisor 1 ($a_i$).

The reference numeral 6 designates a controller for generating a control signal 7 in response to the first multiplier 3 ($a_1$-$a_3$), 4 designates a first multiplier for carrying out multiplication in response and the divisor 1 ($a_1$) and the control signal 7, 5 designates a second multiplier for carrying out multiplication in response to the dividend 2 ($b_i$) and the control signal 7, 8 designates a first intermediate divisor ($c_i$), the output of the first multiplier 4 represented in the redundant binary number, and 9 designates a first intermediate quotient ($d_i$), the output of the second multiplier 5 represented in the redundant binary number.

The reference numeral 10 designates a second multiplier ($c_3$–$c_5$) including two bits of the first intermediate divisor 8 ($c_i$), 11 designates a third multiplier carrying out multiplication in response to the first intermediate divisor 8 ($c_i$) and the second multiplier 10 ($c_3$–$c_5$), 12 designates a fourth multiplier carrying out multiplication in response to the first intermediate quotient 9 ($d_i$) and the second multiplier 10 ($c_3$–$c_5$), 13 designates a second intermediate divisor ($e_i$), the output of the third multiplier 11 represented in the redundant binary number, and 14 designates a second intermediate quotient ($f_i$), the output of the fourth multiplier 12 represented in the redundant binary number.

The reference numeral 15 designates a third multiplier ($e_4$–$e_6$) including three bits of the second intermediate divisor 13 ($e_i$), 16 designates a fifth multiplier carrying out multiplication in response to the second intermediate divisor 13 ($e_i$) and the third multiplier 15 ($e_4$–$e_6$), 17 designates a sixth multiplier carrying out multiplication in response to the second intermediate quotient 14 ($f_i$) and the third multiplier 15 ($e_4$–$e_6$), 18 designates a third intermediate divisor ($g_i$), the output of the fifth multiplier 16 represented in the redundant binary number, and 19 designates a third intermediate quotient ($h_i$), the output of the sixth multiplier 17 represented in the redundant binary number.

The reference numeral 20 designates a fourth multiplier ($g_6$–$g_{10}$) including five bits of the third intermediate divisor 18 ($g_i$), 21 designates a seventh multiplier carrying out multiplication in response to the third intermediate quotient 19 ($h_i$) and the fourth multiplier 20 ($g_6$–$g_{10}$), and 22 designates a fourth intermediate quotient ($k_i$), the output of the seventh multiplier 21 represented in the redundant binary number. The reference numeral 23 designates a redundant binary to binary converter for converting the fourth intermediate quotient 22 ($k_i$) represented in the redundant binary number into the corresponding one represented in the ordinary binary number, and 24 designates a quotient ($q_i$), the answer of the division.

Next, the operation will be described.

First, the following multiplications are carried out on the upper four bits of the divisor 1 ($a_i$).

$$(c_i)=(a_i): \text{ when } 1 \leq (a_i) < 5/4 \quad [5]$$

$$(c_i)=(3/4) \times (a_i): \text{ when } 5/4 \leq (a_i) < 13/8 \quad [6]$$

$$(c_i)=(1/2) \times (a_i): \text{ when } 13/8 \leq (a_i) < 2 \quad [7]$$

This makes it possible to keep the value $c_i$ in the following range.

$$3/4 < (c_i) < 5/4 \quad [8]$$

The number ($c_i$) can be represented as follows in the redundant binary number in which each digit has three values of –1, 1 and 0.

$$(c_i)=1.00c_3c_4c_5 \ldots \quad [9]$$

This is because 3/4 and 5/4 can be represented as follows in the redundant binary number, and hence ($c_i$), having a value between these values, can be represented in the form of equation [9] without fail.

$$3/4=1.00-1-1-1\ldots \quad [10]$$

$$5/4=1.00111\ldots \quad [11]$$

The second multiplier 5 carries out the following computations on the dividend 2 ($b_i$) in a manner similar to those of equations [5]–[7].

$$(d_i)=(b_i): \text{ when } 1 < (a_i) \leq 5/4 \quad [12]$$

$$(d_i)=(3/4) \times (b_i): \text{ when } 5/4 \leq (a_i) < 13/8 \quad [13]$$

$$(d_i)=(1/2) \times (b_i): \text{ when } 13/8 \leq (a_i) < 2 \quad [14]$$

Next, to describe the multiplication by the third multiplier 11 and fifth multiplier 16, some general characteristics of the redundant binary number will be explained. We assume that the redundant binary number ($x_i$) is represented as follows:

$$(x_i)=1.00\ldots 0x_{n+1}\ldots x_{2n}x_{2n+1}\ldots \quad [15]$$

where the number of consecutive 0's immediately after the radix point is assumed to be a positive integer n.

The ($x_i$) can be represented as $$(x_i)=1+\alpha+\beta \quad [15a]$$

where $$\alpha=(x_{n+1}\ldots x_{2n})/2^{2n} \quad [16]$$

$$\beta=(0.x_{2n+1})/2^{2n} \quad [17]$$

Since ($x_i$) is the redundant binary number, $\alpha$ and $\beta$ are in the following ranges.

$$-(2^n-1)/2^{2n} < \alpha < (2^n-1)/2^{2n},$$

that is $$|\alpha| < (2^n-1)/2^{2n} \quad [18]$$

$$-1/2^n < \beta 1/2^{2n},$$

that is $$|\beta| < 1/2^{2n} \quad [19]$$

Introducing $$(y_i) = (1+\alpha+\beta) \times (1-\alpha) \quad [20]$$

it is represented as follows.

$$(y_i) = 1 - \alpha^2 - \alpha\beta + \beta \quad [21]$$

Representing the absolute value of the second and the successive terms $(-\alpha^2 - \alpha\beta + \beta)$ by $\epsilon$, it can be expressed as follows from equations [18] and [19].

$$\epsilon = |\alpha|^2 + |\alpha||\beta| + |\beta| \quad [22]$$
$$< ((2^n-1)/2^{2n})^2 + ((2^{2n}-1)/2^{2n} \times 1/2^{2n}) + (1/2^{2n})$$
$$= (2^{2n+1} - 2^n)/2^{4n} < 2^{-(2n-1)}$$

Therefore, $(y_i)$ can be represented in the redundant binary notation as follows:

$$(y_i) = 1.00 \ldots 0 y_{2n} y_{2n+1} \ldots \quad [23]$$

where the number of consecutive 0's immediately after the radix point is $(2n-1)$.

Thus, the redundant binary number $(y_i)$ including $(2n-1)$ consecutive 0's immediately after the radix point as shown in equation [23] can be obtained from the given redundant binary number $(x_i)$ represented in the form of equation [15] by multiplying $(x_i)$ by $(1-\alpha)$, where a consists of the first n digits after the consecutive n 0's.

The third multiplier 11 and the fifth multiplier 16 carries out multiplication based on the foregoing idea. First, the third multiplier 11 multiplies the first intermediate divisor 8 $(c_i)$ containing two 0's immediately after the radix point as expressed by equation [9] by the number $(1.00\text{-}c_3\text{-}c_4)$, thereby outputting the second intermediate divisor 13 $(e_i)$ expressed as follows.

$$(e_i) = (c_i) \times (1.00\text{-}c_3\text{-}c_4) = 1.000 e_4 e_5 \ldots \quad [24]$$

Thus, $(e_i)$ contains three 0's immediately after the radix point.

Since $(1.00\text{-}c_3\text{-}c_4)$ can be generated by inverting the sign of the two redundant binary digits $c_3$ and $c_4$, the second multiplier 10 $(c_3\text{-}c_4)$ can be generated from the two digits $c_3$ and $c_4$ when $(c_i)$ is the multiplicand. For example, when $c_3$ is "1", it is inverted to "-1", whereas when "0", it is inverted to "1", while maintaining its value "0" when it is "0". Likewise, the fifth multiplier 16 multiplies the second intermediate divisor 13 $(e_i)$, containing three consecutive 0's after the radix point, by $(1.000\text{-}e_4\text{-}e_5 e_6)$.

As a result, the third intermediate divisor 18 $(g_i)$ output from the fifth multiplier 16 is expressed in the following form which contains five consecutive 0's after the radix point.

$$(g_i) = 1.00000 g_6 g_7 \ldots \quad [25]$$

Since $(1.000\text{-}e_4\text{-}e_5\text{-}e_6)$ can be generated by inverting the three redundant binary bit digits $e_4$, $e_5$ and $e_6$, the third multiplier 15 $(e_4\text{-}e_6)$ can be generated from the three digits $e_4$, $e_5$ and $e_6$ when $(e_i)$ is the multiplicand.

The fourth multiplier 12 multiplies the first quotient $(d_i)$ by $(1.00\text{-}c_3\text{-}c_4)$ generated from the second multiplier 10 $(c_3\text{-}c_4)$, thereby generating the second intermediate quotient 14 $(f_i)$. The sixth multiplier 17 multiplies the second intermediate quotient 14 $(f_i)$ by $(1.000\text{-}e_4\text{-}e_5\text{-}e_6)$ generated from the third multiplier 15 $(e_4\text{-}e_6)$, thereby generating the third intermediate quotient 19 $(h_i)$. Similarly, the seventh multiplier 21 multiplies the third intermediate quotient 19 $(h_i)$ by $(1.00000\text{-}g_6\text{-}g_7\text{-}g_8\text{-}g_9\text{-}g_{10})$, thereby generating the fourth intermediate quotient 22 $(k_i)$.

By the successive multiplications, the intermediate quotients gradually approach the true quotient obtained by dividing the dividend 2 $(b_i)$ by the divisor 1 $(a_i)$. This will be described in more detail. Introducing the following r, the fourth intermediate quotient 22 $(k_i)$ can be expressed as equation [27].

$$r = (m_0.m_1 m_2) \times (1.00\text{-}c_3\text{-}c_4) \times (1.000\text{-}e_4\text{-}e_5\text{-}e_6) \times (1.00000\text{-}g_6\text{-}g_7\text{-}g_8\text{-}g_9\text{-}g_{10}) \quad [26]$$

where $m_0.m_1 m_2$ is one of the values 1, 3/4 and 1/2 defined in equations [5]–[7], and [12]–[14].

$$(k_i) = r \times (b_i) \quad [27]$$

In addition, from equation [28], equation [29] is obtained.

$$(m_0 m_1 m_2) \times (1.00\text{-}c_3\text{-}c_4) \times (1.000\text{-}e_4\text{-}e_5\text{-}e_6) \times (a_i) = (g_i) \quad [28]$$

$$r \times (a_i) = (g_i) \times (1.00000\text{-}g_6\text{-}g_7\text{-}g_8\text{-}g_9\text{-}g_{10}) \quad [29]$$

From equation [23], $r \times (a_i)$ takes a value containing nine $(=2\times 5-1)$ consecutive 0's after the radix point because $(g_i)$ contains five consecutive 0's after the radix point. In other words, it is in the following range.

$$1-10^{-9} < r \times (a_i) < 1+10^{-9} \quad [30]$$

Changing equation [27] as $$(k_i) = (r \times (a_i)) \times ((b_i/(a_i)) \quad [31]$$

and substituting expression [30] into [31], and considering that $$(b_i)/(a_i) < 2 \quad [32]$$

the following expression can be obtained.

$$(b_i)/(a_i) - 10^{-8} < (k_i) < (b_i)/(a_i) + 10^{-8} \quad [33]$$

Thus, it is confirmed that the fourth intermediate quotient 22 $(k_i)$ approximately equals the quotient $(b_i)$ with an accuracy $10^{-8}$ (the seventh place after the radix point), which means that the embodiment 1 can obtain the quotient with the same accuracy as that of the input multiplier and multiplicand.

The fourth intermediate quotient 22 $(k_i)$ is converted from the redundant binary number to the ordinary binary number by the redundant binary to binary converter 23, and is finally output as the binary number quotient 24 $(q_i)$.

According to the embodiment 1, since the multipliers carry out multiplications using the redundant binary numbers as described above, the final addition performed in the conventional carry lookahead divider becomes unnecessary, which enables the embodiment 1 to implement fast division. In addition, the multipliers of the multipliers can be easily generated from part of the multiplicand without using the two's complementer used in the conventional divider. This enables the embodiment 1 to further speed up the division. Moreover, since the data flows in one direction from top to bottom in FIG. 1, the next data can be fed during the processing of the current data, which further improves the processing performance.

Although the accuracy of the quotient is up to the seventh place after the radix in the embodiment 1, a quotient with any desired accuracy can be obtained by increasing the computation steps as described in the embodiment 1, when more accurate result is required.

Embodiment 2

Figures 2, 3:
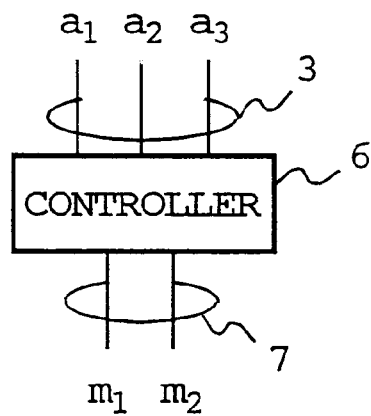
FIG. 2 is a diagram illustrating a controller of a second embodiment of the divider in accordance with the present invention.
FIG. 3 is a diagram showing functions of the controller of the second embodiment.

FIG. 2 is a diagram illustrating the controller 6 of an embodiment 2 of the divider in accordance with the present invention. It generates two outputs $m_1$ and $m_2$ from three input signals $a_1$, $a_2$ and $a_3$. The multiplications of equations [5]–[7] can be implemented by providing the controller 6 with functions as shown in FIG. 3. More specifically, the multiplications of equations [5]–[7] can be achieved by multiplying the divisor 1 ($a_i$) by ($m_i$) by the first multiplier 4, where $m_i$ is the control signal 7 output from the controller 6 and represented in the redundant binary number of three digits expressed as equation [34]. The $m_i$ is generated from the input signals $a_1$–$a_3$ by the rule as shown in the table of FIG. 3.

$$(m_i)=m_0.m_1m_2 \text{ where } m_0=1 \qquad [34]$$

As a result, the first intermediate divisor 8 ($c_i$) as expressed by equation [9] can be obtained. Since $m_0$ is always zero, it is not necessary to generate it.

Likewise, the second multiplier 5 multiplies the dividend 2 ($b_i$) by ($m_i$) in accordance with equations [12]–[14], and outputs the resultant product as the first intermediate quotient 9 ($d_i$) represented in the redundant binary number.

According to the embodiment 2, using the controller 6 with the foregoing structure makes it possible to implement the effect of the embodiment 1 described above.

The embodiment 2 can be applied to any forms of 2-bit representation of the redundant binary number which takes three values for each bit.

Embodiment 3

FIGS. 4 and 5 are diagrams illustrating a generating method of the first intermediate divisor 8 ($c_i$) by the controller 6 and the first multiplier 4 of an embodiment 3 of the divider in accordance with the present invention. In FIGS. 4 and 5, the number of combinations of the upper 4 bits of the divisor 1 ($a_i$) is eight because $a_0$ is always "1". The eight combinations are shown in FIG. 4 as cases 1–8. The two bits immediately after the radix point of the first intermediate divisor 8 ($c_i$) must be zero as shown by equation [9]. The cases 1 and 2 satisfy this condition without change because $a_1$ and $a_2$ are already zero. Thus, ($a_i$) is adopted as ($c_i$) without change, which corresponds to equation [5]. The processings for the cases 3–8 are shown in FIG. 5.

First, the cases 3–5 each correspond to (a)–(c) of FIG. 5, in which ($a_i$) is shifted to the right by two bits and the shifted ($a_i$) is subtracted from the unshifted ($a_i$). This operation corresponds to equation [6]. In the cases 3 and 4, since the upper four bits of the differences are "1.001", they can be output without change. On the other hand, although the upper four bits of the difference of the case 5 are "1.1–1–1", they can be replaced by "1.001" because "1–1–1" is equivalent to "001" in the redundant binary number.

The cases 6–8 each correspond to (d)–(f) of FIG. 5, in which ($a_i$) is shifted to the right by one bit and the shifted ($a_i$) is subtracted from the unshifted ($a_i$). This operation corresponds to equation [7]. Although the upper four bits of the difference of the case 6 are "1.0–11", they can be replaced by "1.00–1" because "–11" is equal to "0–1" in the redundant binary number. In the cases 7 and 8, since the upper four bits of the difference are "1.00–1" and "1.000", respectively, they can be output without change.

In this way, the first intermediate divisor 8 ($c_i$) in the form of equation [9] can be easily generated by the rules as shown in FIGS. 4 and 5.

The embodiment 3 can also be applied to any representations of the redundant binary number.

Embodiment 4

Figure 6:
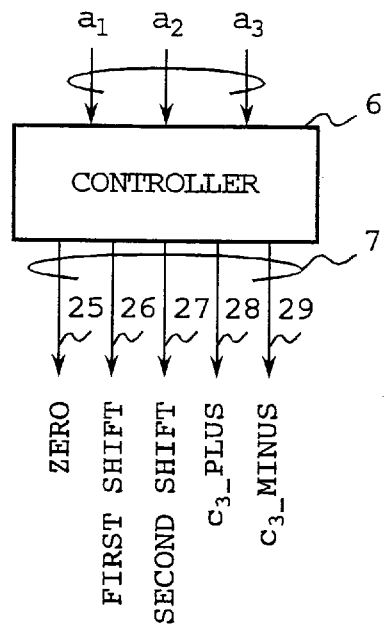
FIG. 6 is a diagram illustrating a controller of a fourth embodiment of the divider in accordance with the present invention.

FIG. 6 is a block diagram illustrating a structure of the controller 6 of an embodiment 4 of the divider in accordance with the present invention. It outputs five types of signals 25–29 as the control signal 7. In addition, it uses a redundant binary number defined by the following expression for any redundant binary number p.

$$p=(p\_\text{plus}, p\_\text{minus})=p\_\text{plus}-p\_\text{minus} \qquad [35]$$

In other words, it defines a redundant binary number as the difference of a pair of binary numbers.

Although the foregoing embodiment 3 computes the first intermediate divisor 8 ($c_i$) from the divisor 1 ($a_i$) by the rules as shown in FIG. 4, these rules can be achieved by using equation [34] ([35]?????) by making each bit of the divisor 1 ($a_i$) zero, shifting the divisor 1 ($a_i$) to the right by one bit, and shifting the divisor 1 ($a_i$) to the right by two bits, which correspond to the control signals zero 25, first shift 26 and second shift 27 of FIG. 6, respectively. In addition, although $c_0$–$c_2$ are made "1.00", $c_3$ varies depending on the input. Hence, control signals $c_3\_\text{plus}$ 28 and $c_3\_\text{minus}$ 29 are generated.

Thus, according to the embodiment 4, the first intermediate divisor 8 ($c_i$) can be obtained only by the shifting operations without performing multiplication.

Embodiment 5

Figure 7:
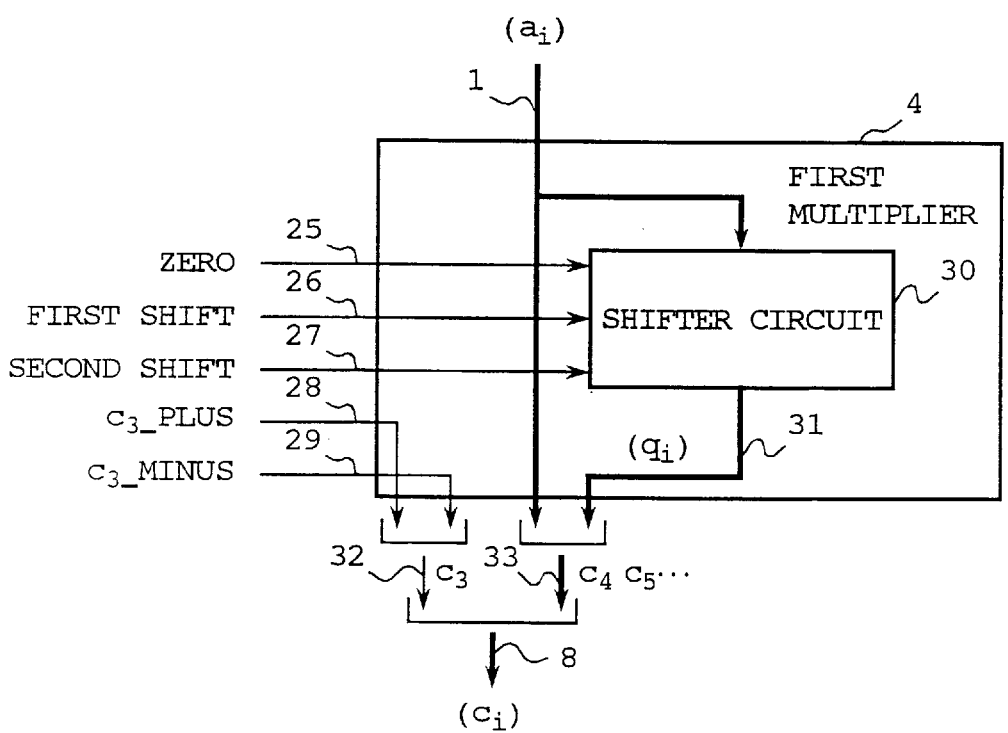
FIG. 7 is a block diagram illustrating a first multiplier of a fifth embodiment of the divider in accordance with the present invention.

FIG. 7 is a block diagram showing a configuration of the first multiplier 4 of an embodiment 5 of the divider in accordance with the present invention for implementing the foregoing embodiments 3 and 4. The first multiplier 4 includes a shifter circuit 30 for carrying out shifting operations in response to the control signals zero 25, first shift 26 and second shift 27. When the zero 25 is "1", the output ($q_i$) 31 of the shifter circuit 30 is all zero, when the first shift 26 is "1", the output ($q_i$) 31 is obtained by shifting the divisor 1 ($a_i$) to the right by one bit, and when the second shift 26 is "1", the output ($q_i$) 31 is obtained by shifting the divisor 1 ($a_i$) to the right by two bits. The output ($q_i$) 31 thus produced is paired with the divisor 1 ($a_i$) to generate the fourth and successive digits ($c_4c_5$ . . . ) 33 after the radix point of the first intermediate divisor 8 ($c_i$).

Thus, ($c_i$) can be expressed as $$c_i=(a_i, q_i) \text{ where } i=4, 5, \qquad [36]$$

In addition, a first intermediate divisor 32 ($c_3$) is output as a pair of $c_3\_\text{plus}$ and $c_3\_\text{minus}$ without change in accordance with the rules of FIG. 4. Since first intermediate divisors $c_0$–$c_2$ are constant as "1.00", it is unnecessary to generate them here.

Thus, according to the embodiment 5, the first intermediate divisor 8 ($c_i$) can be obtained only by the shifting operations without performing multiplication. This makes it possible to implement a fast, small first multiplier 4.

Embodiment 6

Figures 8, 9:
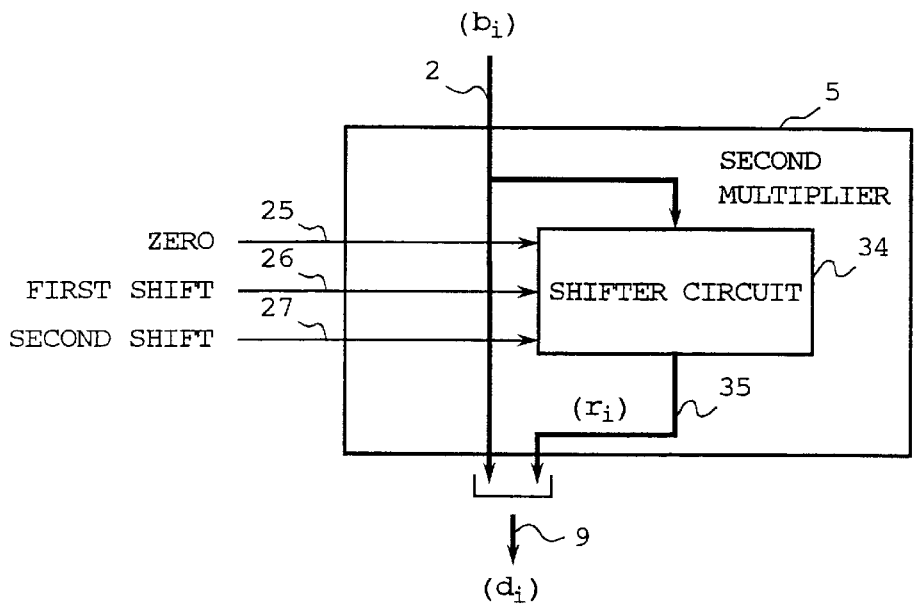
FIG. 8 is a block diagram illustrating a second multiplier of a sixth embodiment of the divider in accordance with the present invention.
FIG. 9 is a diagram illustrating generation of intermediate quotients by the second multiplier of the sixth embodiment.

FIG. 8 is a block diagram showing a configuration of the second multiplier 5 of an embodiment 6 of the divider in accordance with the present invention for implementing the foregoing embodiments 3 and 4. The second multiplier 5 includes a shifter circuit 34 as in the embodiment 5 for carrying out shifting operations in response to the control signals zero 25, first shift 26 and second shift 27. When the zero 25 is "1", the output ($r_i$) 35 of the shifter circuit 34 is all zero, when the first shift 26 is "1", the output ($r_i$) 35 is obtained by shifting the dividend 2 ($b_i$) to the right by one bit, and when the second shift 26 is "1", the output ($r_i$) 35 is obtained by shifting the dividend 2 ($b_i$) to the right by two bits. The shifting operations are performed on each bit following the radix point of the dividend 2 ($b_i$) as shown in FIG. 9, and the output ($r_i$) 35 thus produced is paired with the dividend 2 ($b_i$) to generate the first intermediate quotient 9 ($d_i$).

According to the embodiment 6, the first intermediate quotient 9 ($d_i$) can be obtained only by the shifting operations without performing multiplication. This makes it possible to implement a fast, small second multiplier 5.

Embodiment 7

Figure 10:
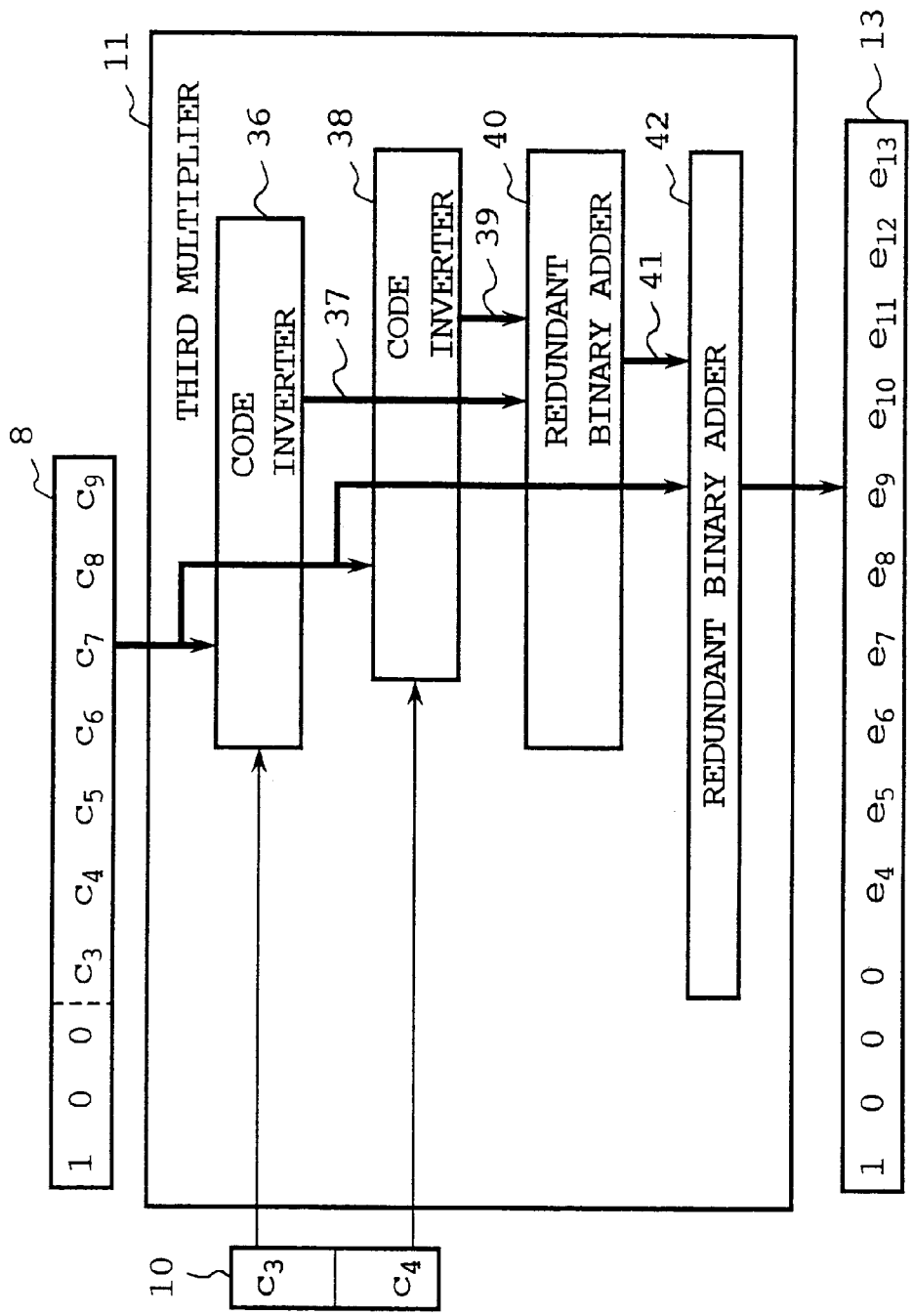
FIG. 10 is a block diagram illustrating a third multiplier of a seventh embodiment of the divider in accordance with the present invention.

FIG. 10 is a block diagram showing a configuration of the third multiplier 11 of an embodiment 7 of the divider in accordance with the present invention. In this figure, the reference numerals 36 and 38 each designate a code inverter for inverting the digits of the first intermediate divisor 8 ($c_i$) in the form of redundant binary number, using the second multipliers $C_3$ and $C_4$ obtained from the first intermediate divisor 8 ($c_i$) as a control signal, respectively. The reference numerals 40 and 42 each designate a redundant binary adder for summing up two redundant binary numbers to output one redundant binary number. The third multiplier 11 of the present embodiment 7 is for computing equation [24], which generates two redundant binary numbers 37 and 39, which correspond to $-c_3 \times (c_i)$ and $-c_4 \times (c_i)$, respectively, from the first intermediate divisor 8 ($c_i$), and takes a sum of the first intermediate divisor 8 ($c_i$) and the two redundant binary numbers 37 and 39 in a so-called Wallace tree fashion, thereby achieving ($e_i$)=($c_i$)×(1.00-$c_3$-$c_4$).

Next, the operation of the embodiment will be described.

First, the significant bits $c_3$–$c_9$ of the input first intermediate divisor 8 ($c_i$) are code inverted by the code inverters 36 and 38 using the multipliers $c_3$ and $c_4$ as the control signal, respectively. Specifically, when the multiplier $c_3$ is "0", the code inverter 36 outputs the redundant binary number 37 whose bits are all zero, when the multiplier $c_3$ is "1", it inverts all the significant bits $c_3$–$c_9$, and outputs the result as the redundant binary number 37, and when the multiplier $c_3$ is "−1", it outputs the significant bits $c_3$–$c_9$ without change as the redundant binary number 37. The redundant binary number 37 is shifted to the right by three bits with respect to the input when it is output.

Second, the code inverter 38 operates as follows. When the multiplier $c_4$ is "0", the code inverter 38 outputs the redundant binary number 39 whose bits are all zero, when the multiplier $c_4$ is "1", it inverts all the significant bits $c_3$–$c_9$, and outputs the result as the redundant binary number 39, and when the multiplier $c_4$ is "−1", it outputs the significant bits $c_3$–$c_9$ without change as the redundant binary number 39. The redundant binary number 39 is shifted to the right by four bits with respect to the input when it is output.

The redundant binary adder 40 sums up the two redundant binary numbers 37 and 39 to output one redundant binary number 41. The redundant binary adder 42 sums up the input first intermediate divisor 8 ($c_i$) and the redundant binary number 41 to output a redundant binary number as the second intermediate divisor 13 ($e_i$). The code inversion of the significant bits $c_3$–$c_9$ can be easily achieved by replacing ($a_i$, $q_i$) in equation [36] by ($q_i$, $a_i$).

According to the present embodiment 7, the multiplication result can be obtained very fast because the upper three bits of the first intermediate divisor 8 ($c_i$) are not handled directly, and the ripple of the carry signal does not usually occur in the redundant binary addition.

Embodiment 8

Figure 11:
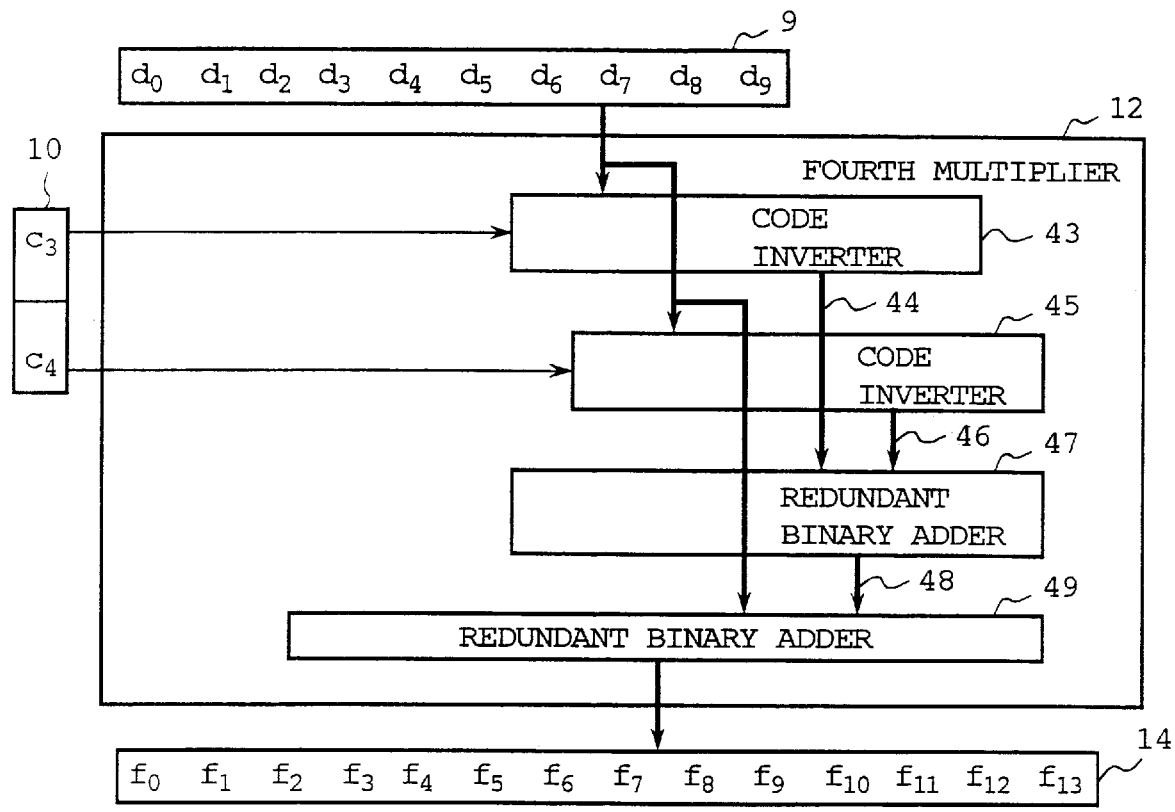
FIG. 11 is a block diagram illustrating a fourth multiplier of an eighth embodiment of the divider in accordance with the present invention.

FIG. 11 is a block diagram showing a configuration of the fourth multiplier 12 of an embodiment 8 of the divider in accordance with the present invention. The fourth multiplier 12 is analogous to the third multiplier 11 shown in the foregoing embodiment 7. In this figure, the reference numerals 43 and 45 each designate a code inverter for inverting the bits of the first intermediate quotient 9 ($d_i$) in the form of redundant binary number, using the second multipliers $c_3$ or $c_4$ as a control signal. The reference numerals 47 and 49 each designate a redundant binary adder for summing up two input redundant binary numbers to output one redundant binary number.

Next, the operation of the embodiment will be described.

First, the input first intermediate quotient 9 ($d_i$) is code inverted by the code inverters 43 and 45 using the multipliers $c_3$ and $c_4$ as the control signal, respectively. Specifically, when the multiplier $c_3$ is "0", the code inverter 43 outputs a redundant binary number 44 whose bits are all zero, when the multiplier $c_3$ is "1", it inverts all the significant bits $d_3$–$d_9$, and outputs the result as the redundant binary number 44, and when the multiplier $c_3$ is "−1", it outputs the significant bits $d_3$–$d_9$ without change as the redundant binary number 44. The redundant binary number 44 is shifted to the right by three bits with respect to the input when it is output.

Second, the code inverter 45 operates as follows. When the multiplier $c_4$ is "0", the code inverter 45 outputs the redundant binary number 46 whose bits are all zero, when the multiplier $c_4$ is "1", it inverts all the significant bits $d_3$–$d_9$, and outputs the result as the redundant binary number 46, and when the multiplier $c_4$ is "−1", it outputs the significant bits $d_3$–$d_9$ without change as the redundant binary number 39. The redundant binary number 44 is shifted to the right by four bits with respect to the input when it is output.

The redundant binary adder 47 sums up the two redundant binary numbers 44 and 46 to output one redundant binary number 48. The redundant binary adder 49 sums up the input first intermediate quotient 9 ($d_i$) and the redundant binary number 48 to output a redundant binary number as the second intermediate quotient 14 ($f_i$).

According to the present embodiment 8, the multiplication result can be obtained very fast because the ripple of the carry signals does not usually occur in the redundant binary addition. Furthermore, the multiplier of the embodiment 8 can be applied not only to the fourth multiplier 12, but also to the sixth multiplier 17 and seventh multiplier 21.

Embodiment 9

Figure 12:
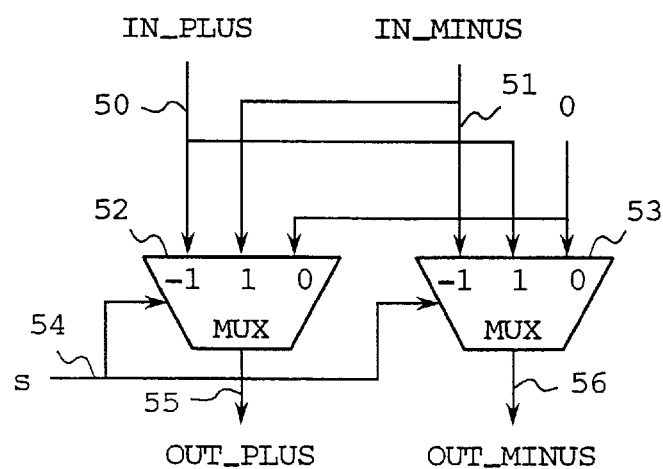
FIG. 12 is a circuit diagram showing a code inverter of a ninth embodiment of the divider in accordance with the present invention.

FIG. 12 is a circuit diagram showing each bit of a code inverter of an embodiment 9 of the divider in accordance with the present invention. The code inverter is designed to implement the embodiments 7 and 8. In this figure, in_plus 50 and in_minus 51 are individual elements of a pair of redundant binary numbers input to the code inverter, (s) 54 designates a control input in the form of a redundant binary number, and out_plus 55 and out_minus 56 are individual elements of a pair of redundant binary numbers output from the code inverter. The reference numerals 52 and 53 each designate a multiplexer for selecting the output in response to the control input (s) 54.

With this arrangement, the following desired output can be obtained.

when s=0,
    output_plus=0, out_minus=0;
when s=1,
    out_plus=in_minus, out_minus=in_plus; and when s=-1,
    out_plus=in_plus, and out_minus=in_minus.

Embodiment 10

Figure 13:
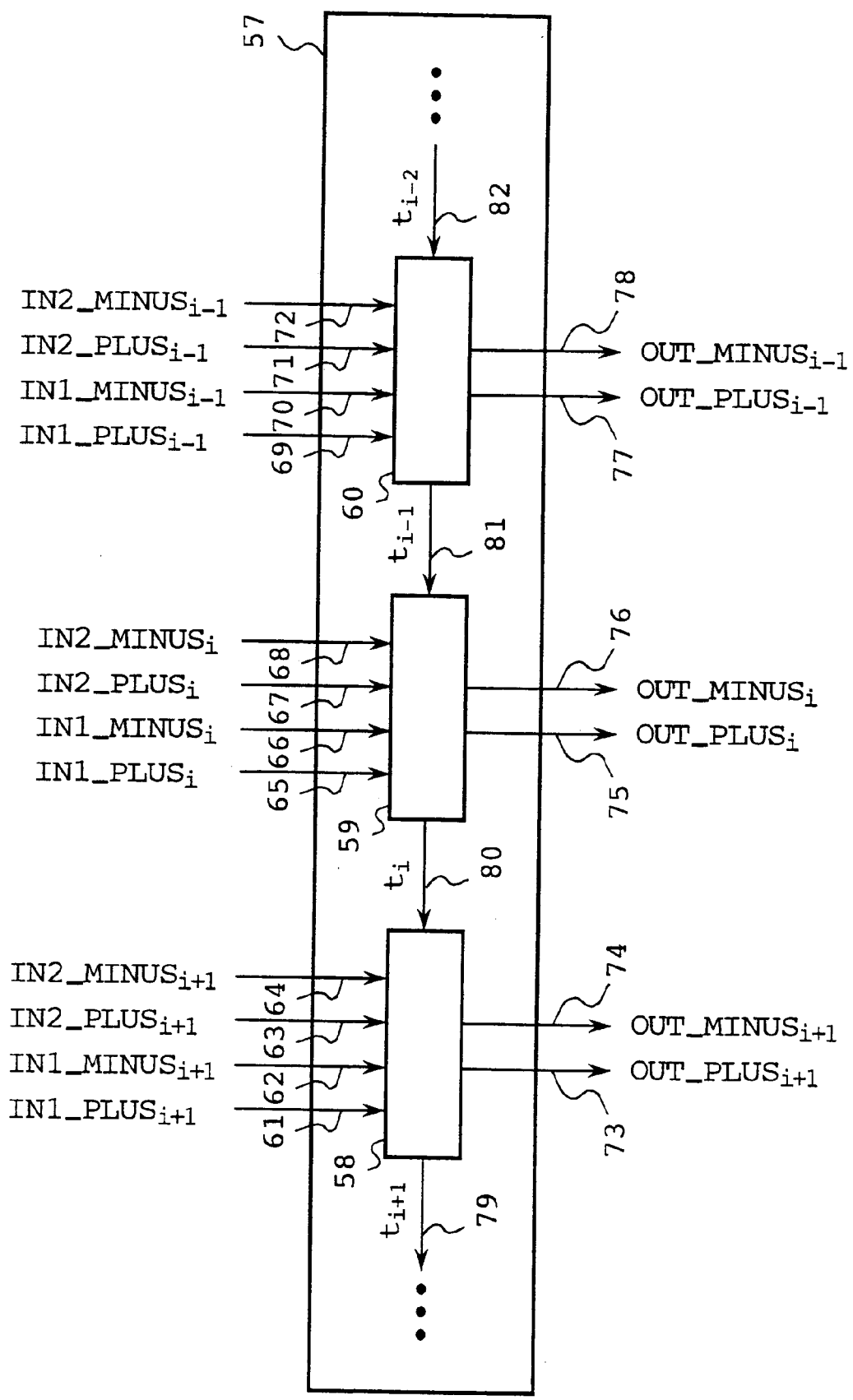
FIG. 13 is a block diagram showing a redundant binary adder of a tenth embodiment of the divider in accordance with the present invention.

FIG. 13 is a block diagram showing a redundant binary adder of an embodiment 10 of the divider in accordance with the present invention, for implementing the foregoing embodiments 7 and 8. In this figure, the reference numeral 57 designates a redundant binary adder including adders 58–60, each for one digit from (i+1)-th to (i–1)-th digit. The (i+1)-th digit adder 58 adds a redundant binary digit in1_plus$_{i+1}$ 61 and in1_minus$_{i+1}$ 62 to a redundant binary digit in2_plus$_{i+1}$ 63 and in2_minus$_{i+1}$ 64, and outputs a redundant binary digit out_plus$_{i+1}$ 73 and out_minus$_{i+1}$ 74, respectively.

Likewise, the i-th digit adder 59 adds a redundant binary digit in1_plus$_i$ 65 and in1_minus$_i$ 66 to a redundant binary digit in2_plus$_i$ 67 and in2_minus$_i$ 68, and outputs a redundant binary digit out_plus$_i$ 75 and out_minus$_i$ 76, and the (i–1)-th digit adder 60 adds a redundant binary digit in1_plus$_{i-1}$ 69 and in1_minus$_{i-1}$ 70 to a redundant binary digit in2_plus$_{i-1}$ 71 and in2_minus$_{i-1}$ 72, and outputs a redundant binary digit out_plus$_{i-1}$ 77 and out_minus$_{i-1}$ 78. Intermediate signals $t_{i+1}$ 79 to $t_{i-2}$ 82, each carried on one or multiple signal lines, are each transferred from a lower adder to the next upper adder. Since the adjacent intermediate signals $t_{i+1}$ 79 and $t_i$ 80 can be usually made independent of each other, the so-called ripple of the carry signals does not occur which takes place in ordinary addition of binary numbers.

Thus, the embodiment 10 with such an arrangement can achieve fast redundant binary addition.

Embodiment 11

Figure 14:
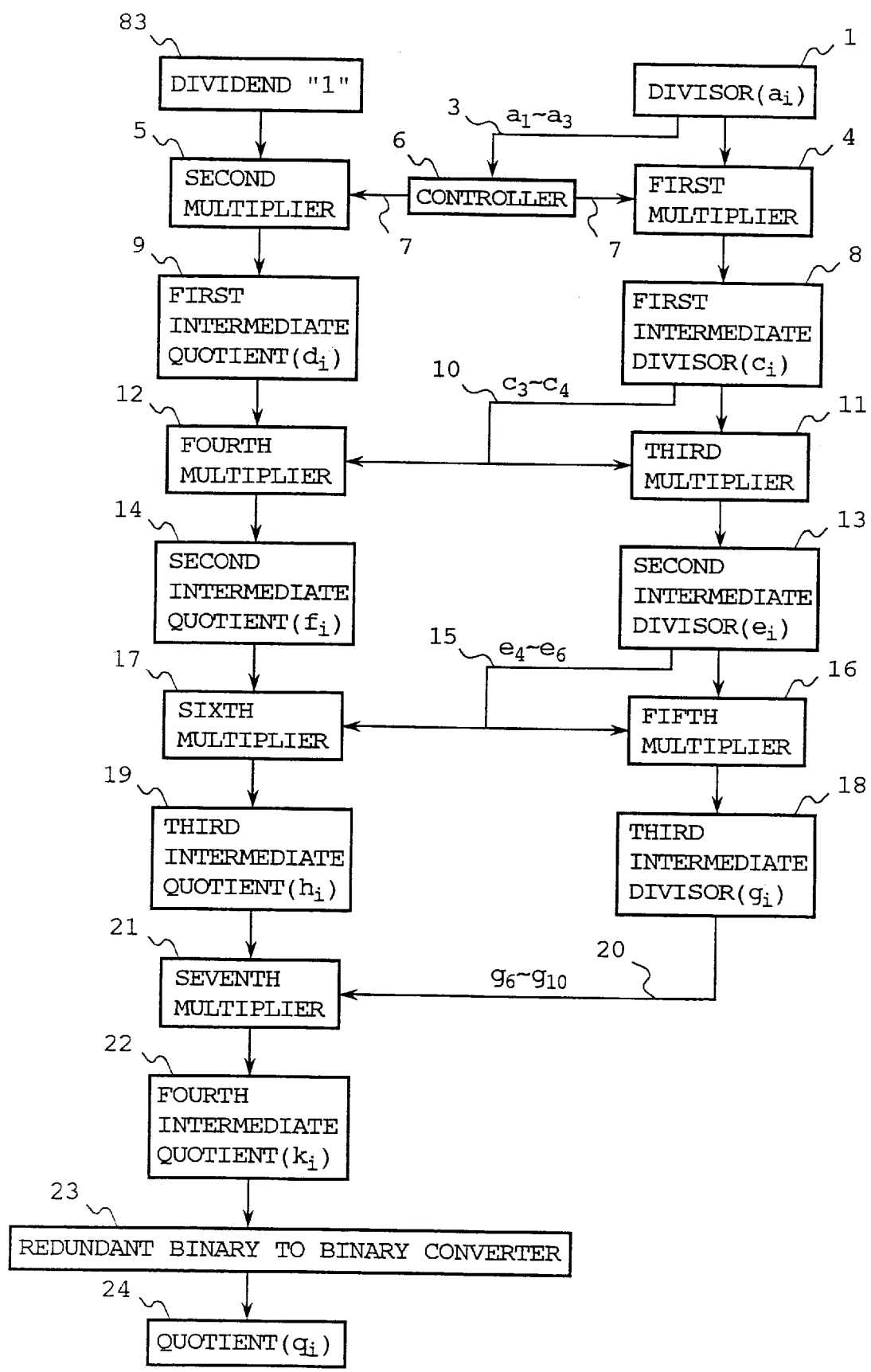
FIG. 14 is a block diagram showing an eleventh embodiment of the divider in accordance with the present invention.

FIG. 14 is a block diagram showing an embodiment 11 of the divider in accordance with the present invention, in which the dividend 2 ($b_i$) of FIG. 1 is replaced with a dividend 83 with a value of "1". The remaining configuration is the same to that of the embodiment 1 in FIG. 1. This makes it possible to achieve a fast inverter of a number.

Embodiment 12

Figure 15:
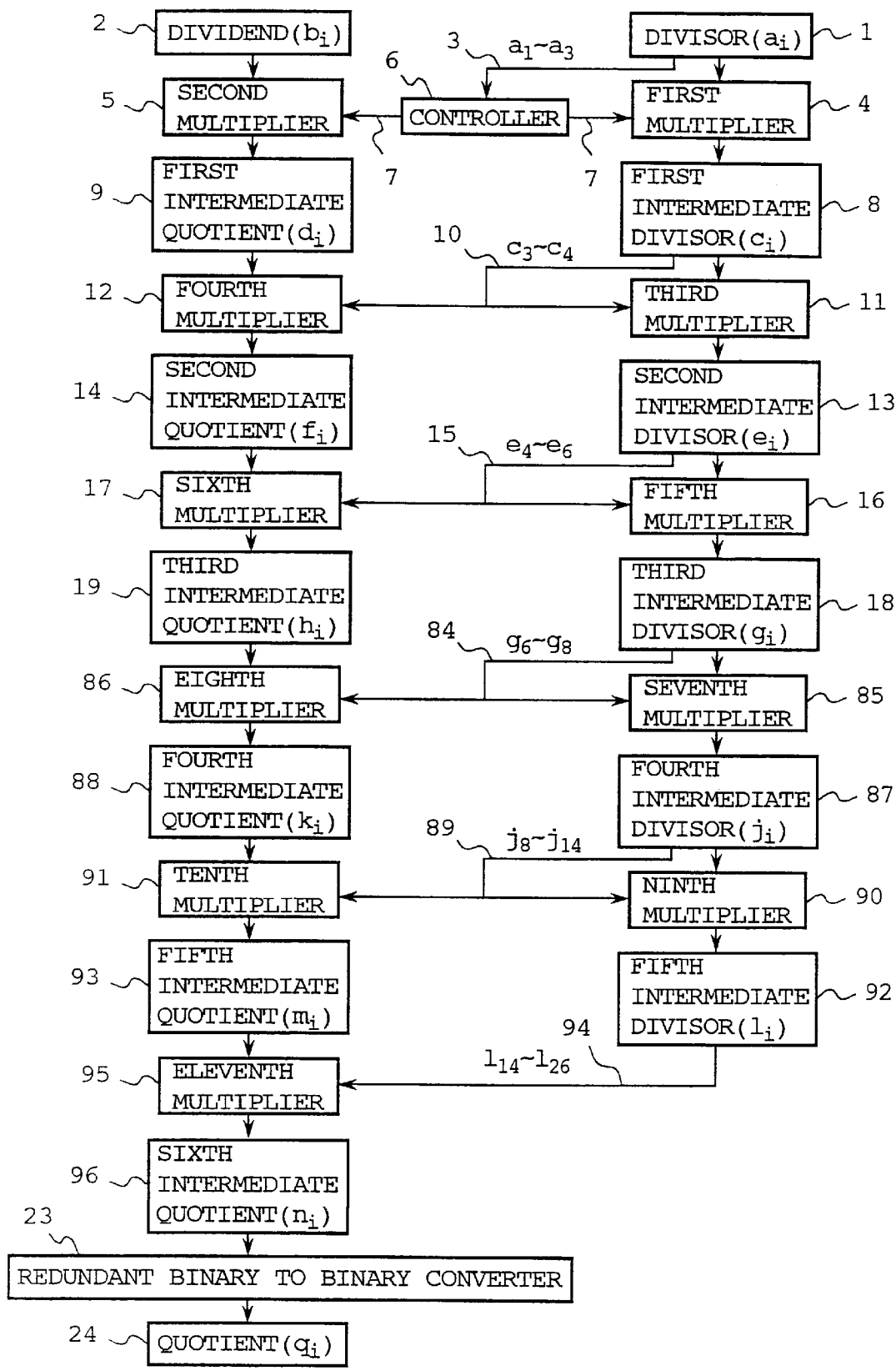
FIG. 15 is a block diagram showing a twelfth embodiment of the divider in accordance with the present invention.

FIG. 15 is a block diagram showing an embodiment 12 of the divider in accordance with the present invention, in which the numbers of bits are made ($2^n$–1) of multipliers 15 ($e_4$–$e_6$), 84 ($g_6$–$g_8$) and 89 ($j_8$–$j_{14}$) which are extracted from the second, third and fourth intermediate divisors 13, 18 and 87, respectively. In this embodiment 12, the quotient is obtained with an accuracy down to 24-th position after the radix point.

Its operation is the same as that of the embodiment 1 until the third intermediate divisor 18 ($g_i$) is obtained. Beyond that, the number of bits of the multiplier 84 is made three bits instead of five bits of the embodiment 1. To generalize equations [16]–[20] of the embodiment 1, let us define as $$\alpha=(x_{n+1}\ldots x_{n+m})/2^{n+m} \qquad [37]$$

$$\beta=(0.x_{n+m+1})/2^{n+m} \qquad [38]$$

then, the following expressions hold.

$$-(2^m-1)/2^{n+m}<\alpha<(2^m-1)/2^{n+m}$$

that is, $$|\alpha|<(2^m-1)/2^{n+m} \qquad [39]$$

$$1/2^{n+m}<\beta<1/2^{n+m}$$

that is, $$|\beta|<1/2^{n+m} \qquad [40]$$

Computing $\epsilon$, the following result is obtained.

$$\epsilon=|\alpha|^2+|\alpha||\beta|+|\beta|<2^{-(n+m-1)} \qquad [41]$$

This means that multiplying the redundant binary number ($x_i$) in the form of equation [15] by (1–$\alpha$) enables the number of consecutive 0's after the radix point to be made (n+m–1). Thus, the number of consecutive 0's after the radix point of the fourth intermediate divisor 87 ($j_i$) is seven which is obtained as a result of the multiplication by a seventh multiplier 85.

Next, the number of bits of a multiplier 89 extracted from the fourth intermediate divisor 87 ($j_i$) is made seven bits. Accordingly, the number of consecutive 0's after the radix point of a fifth intermediate divisor 92 ($l_i$) becomes 13 as a result of the multiplication by a ninth multiplier 90. Then, 13 bits are extracted from the fifth intermediate divisor 92 ($l_i$) as a multiplier 94 ($i_{14}$–$i_{26}$).

On the other hand, an eighth multiplier 86, a tenth multiplier 91 and an eleventh multiplier 95 operate in the same manner as the fourth, sixth and seventh multipliers 12, 17 and 21 in the embodiment 1, thereby generating a fourth intermediate quotient 88 ($k_i$), a fifth intermediate quotient 93 ($m_i$) and a sixth intermediate quotient 96 ($n_i$). The sixth intermediate quotient 96 ($n_i$) is converted into a binary number by the redundant binary to binary converter 23, and the quotient 24 ($q_i$) is output as a final result. The number of bits of the multiplier 15 ($e_4$–$e_6$), that of the multiplier 84 ($g_6$–$g_8$) and that of the multiplier 89 ($j_8$–$j_{14}$) are three, three and seven, respectively, which are expressed as ($2^n$–1).

According to the present embodiment 12, the number of redundant binary numbers to be summed up by the fifth multiplier 16, seventh multiplier 85 and ninth multiplier 90 are one plus the number of bits of the input multipliers 15 ($e_4$–$e_6$), 84 ($g_6$–$g_8$) and 89 ($j_8$–$j_{14}$), respectively. Therefore, when the number of bits of the multiplier is ($2^n$–1), the number of the redundant binary numbers to be summed up becomes $2^n$, at which the efficiency is maximum of summing up in accordance with the Wallace tree. That is, $2^n$ is the maximum number of the redundant binary numbers that can be summed up by an n-stage adder, in which case fast summing up can be achieved at the maximum efficiency.

Embodiment 13

Figure 16:
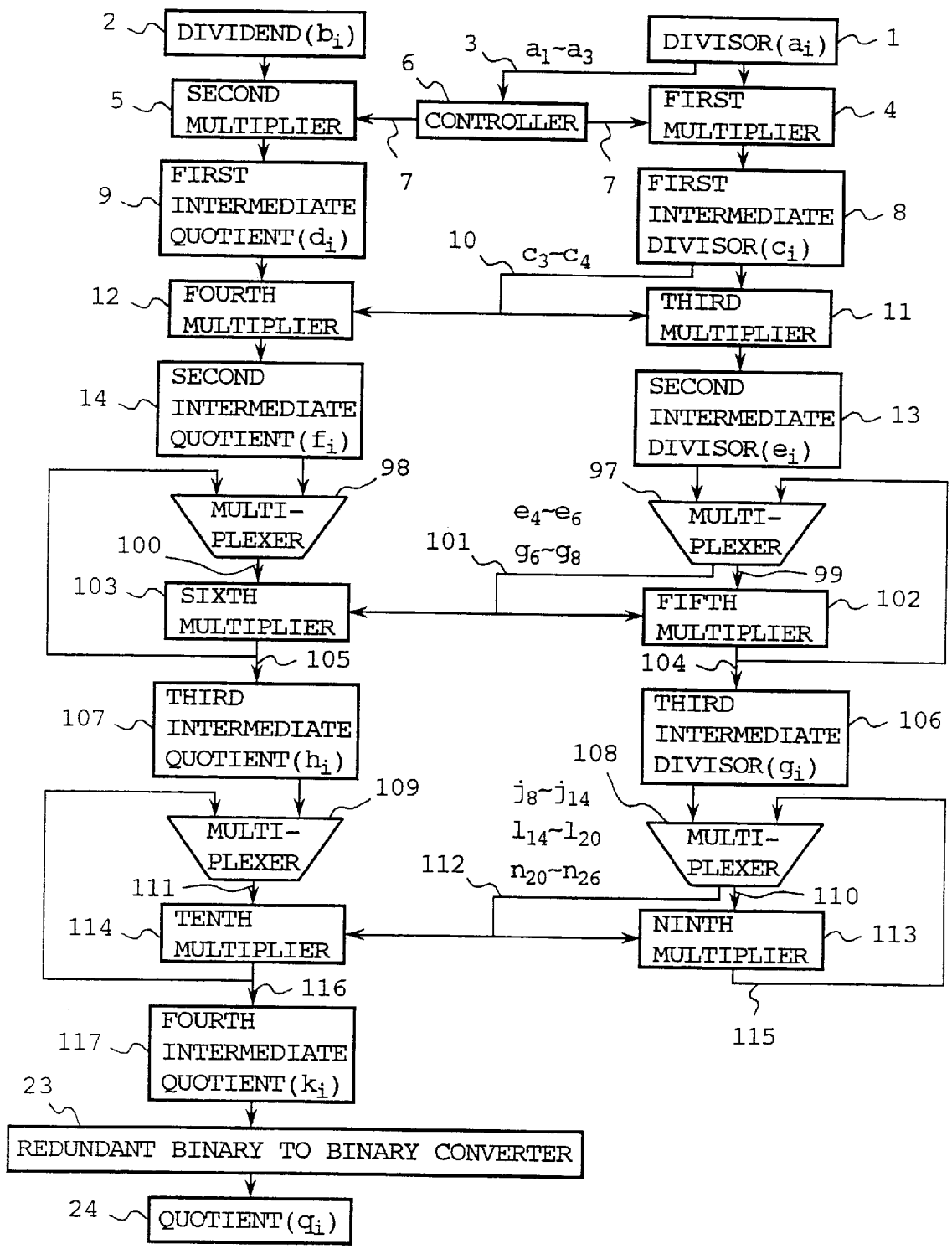
FIG. 16 is a block diagram showing a thirteenth embodiment of the divider in accordance with the present invention.

FIG. 16 is a block diagram showing an embodiment 13 of the divider in accordance with the present invention, which reduces an amount of hardware by using multiplexers. First, a multiplexer 97 selects the second intermediate divisor 13 ($e_i$) to produce an output 99, and at the same time it produces a multiplier 101 ($e_4$–$e_6$), so that a multiplication of the two outputs is carried out by a fifth multiplier 102.

Next, the multiplexer 97 selects an output 104 of the fifth multiplier 102 to produce an intermediate divisor ($g_i$) as the output 99, and at the same time it selects to produce a multiplier 101 ($g_6$–$g_8$), so that a multiplication of the two outputs is carried out by the fifth multiplier 102. The resultant product is a third intermediate divisor 106 ($g_i$).

Subsequently, a multiplexer 108 first selects the third intermediate divisor 106 ($g_i$) as an output 110, and at the same time it makes a selection to produce a multiplier 112 ($j_8$–$j_{14}$), so that a multiplication of the two outputs is carried out by a ninth multiplier 113.

Next, the multiplexer 108 selects an output 115 of the ninth multiplier 113 to produce an intermediate divisor ($l_i$) as the output 110, and at the same time it makes a selection to produce a multiplier 112 ($l_{14}$–$l_{20}$), so that a multiplication of the two outputs is carried out by the ninth multiplier 113.

Subsequently, the multiplexer 108 once again selects the output 115 of the ninth multiplier 113, and selects the multiplier 112 ($n_{20}$–$n_{26}$). In this case, multiplication by the ninth multiplier 113 is not carried out because it is unnecessary.

On the other hand, a multiplexer 98 first selects the second intermediate quotient 14 ($f_i$) to produce an output 100, and a sixth multiplier 103 multiplies the second intermediate quotient 14 ($f_i$) by the multiplier 101 ($e_4$–$e_6$).

Next, the multiplexer 98 selects an output 105 of the sixth multiplier 103 to produce the output 100, and the sixth multiplier 103 multiplies it by the multiplier 101 ($g_6$–$g_8$) to output the product as a third intermediate quotient 107 ($h_i$).

Subsequently, a multiplexer 109 first selects the third intermediate quotient 107 ($h_i$) as an output 111, and a tenth multiplier 114 multiplies it by the multiplier 112 ($j_8$–$j_{14}$).

Next, the multiplexer 109 selects an output 116 of the tenth multiplier 114 to produce the output 111, and the tenth multiplier 114 multiplies it by the multiplier 112 ($l_{14}$–$l_{20}$).

Subsequently, the multiplexer 109 once again selects the output 116 of the tenth multiplier 114, and the tenth multiplier 114 multiplies it by the multiplier 112 ($n_{20}$–$n_{26}$) to output a fourth quotient 117 ($k_i$). The intermediate quotient 117 ($k_i$) is converted into a binary number by the redundant binary to binary converter 23, and output as the quotient 24 ($q_i$).

According to the embodiment 13, the overall amount of the hardware of the divider can be significantly reduced because the multiplexers are smaller than the multipliers.

Embodiment 14

Figure 17:
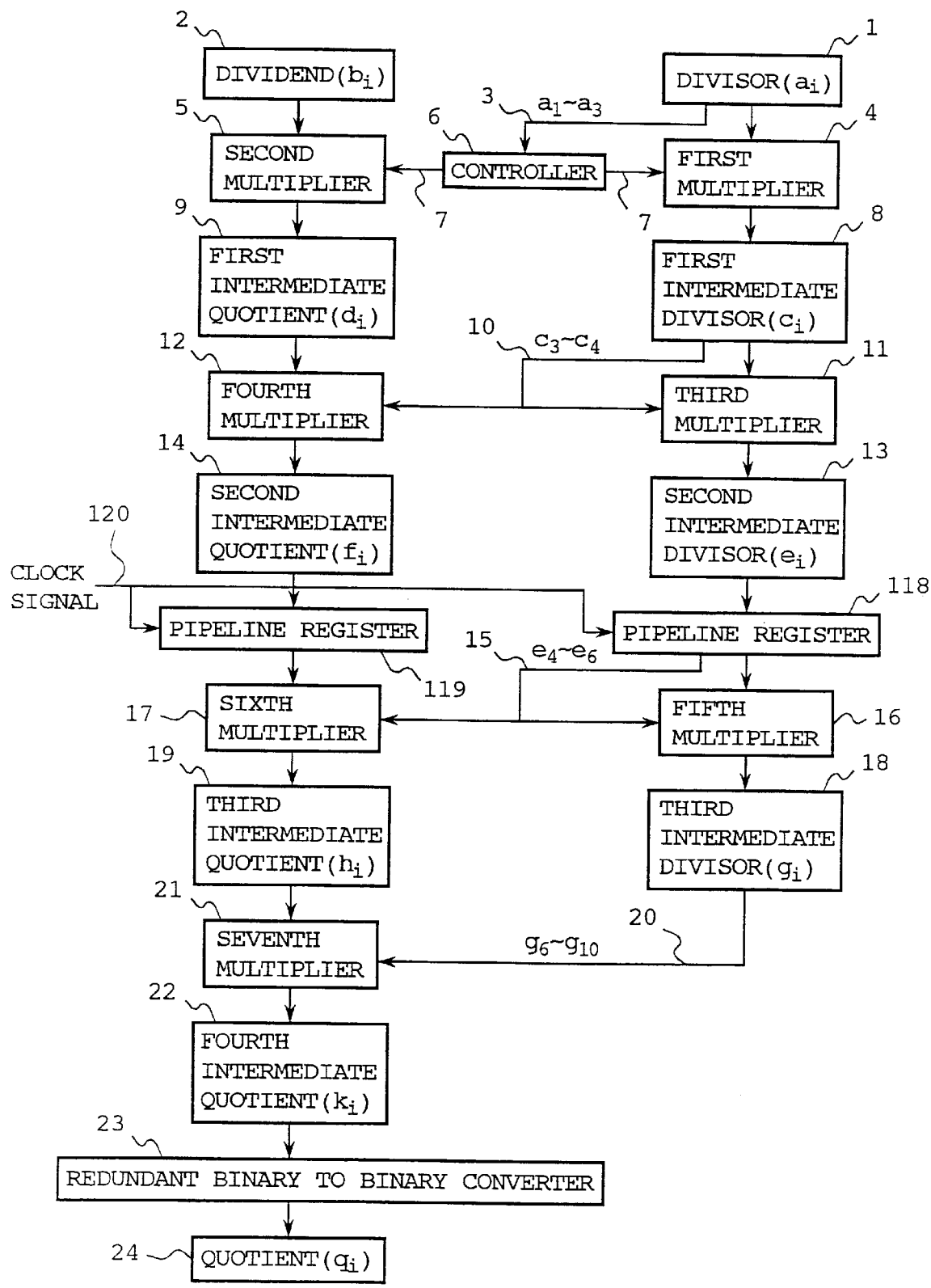
FIG. 17 is a block diagram showing a fourteenth embodiment of the divider in accordance with the present invention.

FIG. 17 is a block diagram showing an embodiment 14 of the divider in accordance with the present invention, which adopts a two-stage pipeline configuration using pipeline registers 118 and 119. Specifically, the second intermediate divisor 13 ($e_i$) and the second intermediate quotient 14 ($f_i$) are temporarily stored in the pipeline registers 118 and 119, and are input to the fifth multiplier 16 and he sixth multiplier 17 at the next stage.

The pipeline registers 118 and 119 are controlled by a clock signal 120 such that the data is stored when the clock signal 120 is at a "low" level, and the data is output when the clock signal 120 is at a "high" level.

According to the present embodiment 14, since the so-called pipeline operation can be achieved, in which the circuits before and after the pipeline registers 118 and 119 can operate in parallel, fast operation can be implemented. Furthermore, although the two-stage pipeline configuration is shown in this embodiment 14, faster operation can be implemented by increasing the number of the pipeline registers to increase the pipeline stages.

Embodiment 15

Figure 18:
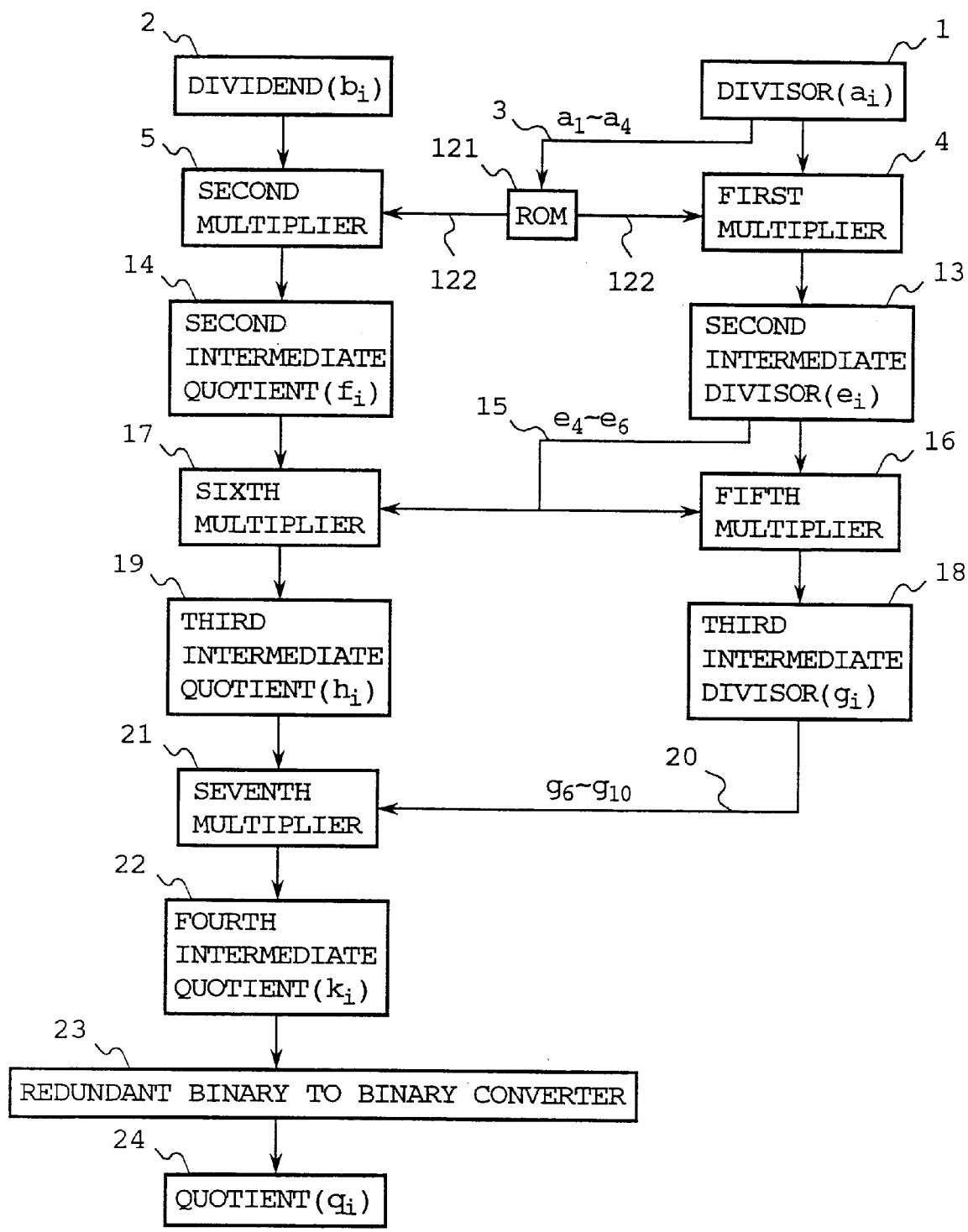
FIG. 18 is a block diagram showing a fifteenth embodiment of the divider in accordance with the present invention.
Figure 19:
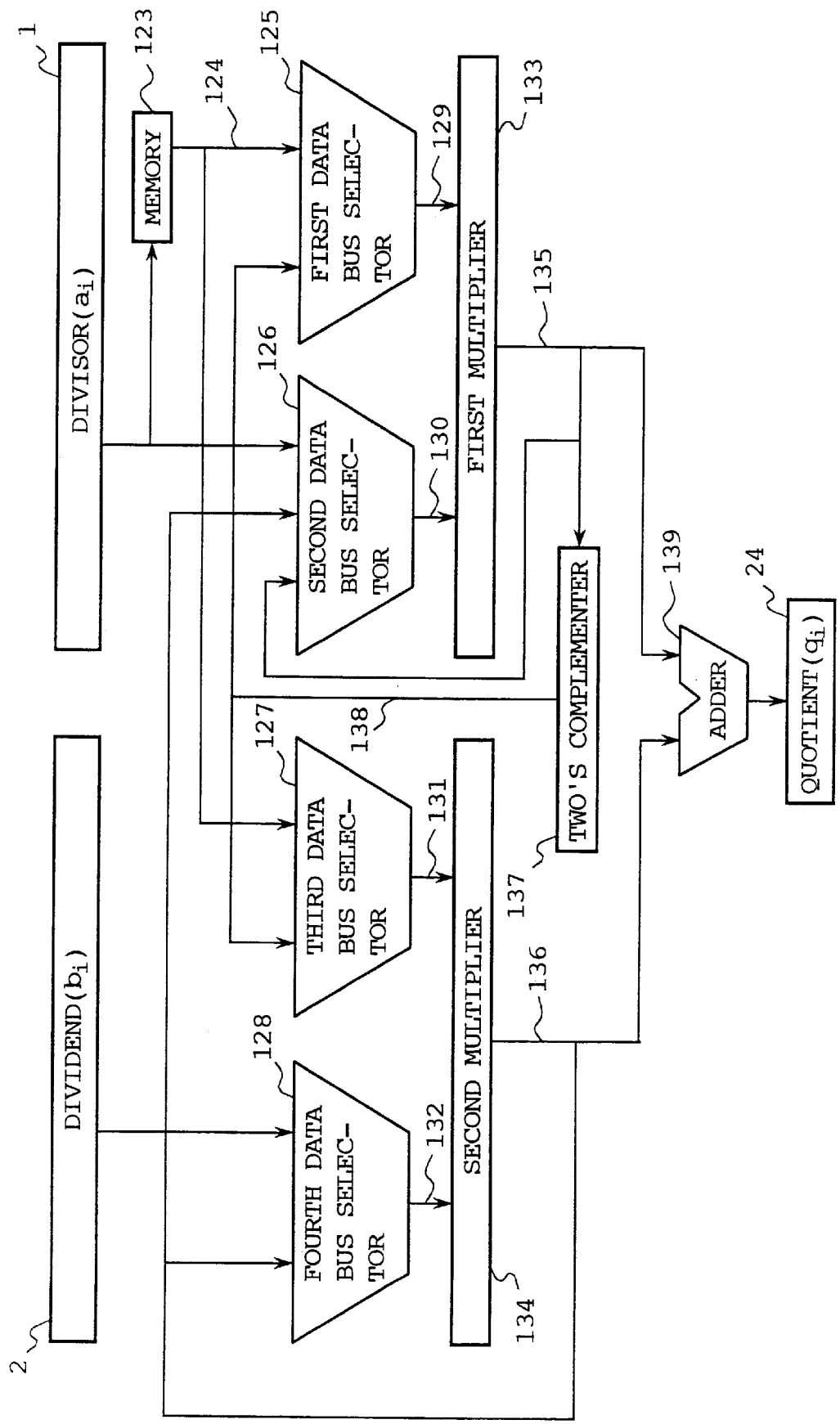
FIG. 19 is a block diagram showing a conventional divider.

FIG. 18 is a block diagram showing an embodiment 15 of the divider in accordance with the present invention, in which a ROM 121 is employed instead of the controller 6 of the foregoing embodiments. The ROM 121 outputs a control signal 122 in response to the multiplier 3 ($a_1$–$a_4$) applied to its address input. The present embodiment 15 can achieve the same operation as the embodiment 1 by using the control signal 122 in place of the control signal 7 of the foregoing embodiments.

Although the number of bits of the input to the ROM 121 is four in the present embodiment 15, it can be increased by augmenting the scale of the ROM. This enables the number of consecutive 0's after the radix point of the second intermediate divisor 13 ($e_i$) output from the first multiplier to be increased as compared with that of the embodiment 1, thereby implementing fast division. The ROM 121 may be replaced by a RAM or other memory devices.

What is claimed is:

1. A divider inputting a dividend and a divisor and outputting a quotient obtained by dividing said dividend by said divisor, said divisor having a value equal to or greater than one and less than two, said divider comprising:

a controller for producing a control signal from a first multiplier, said first multiplier being generated by said controller such that it consists of a predetermined number of upper digits of said divisor, said upper digits including or excluding a most significant digit of said divisor;

first multiplying means for obtaining a first intermediate divisor by multiplying said divisor by said first multiplier, said first intermediate divisor being represented in a redundant binary notation, and having an integer portion of unity and at least two consecutive zeros immediately after its radix point;

second multiplying means for obtaining a first intermediate quotient represented in the redundant binary notation by multiplying said dividend by said first multiplier;

third multiplying means for obtaining a second intermediate divisor by multiplying said first intermediate divisor by a second multiplier, said second multiplier being generated by said third multiplying means by extracting a plurality of upper digits from said first intermediate divisor and by inverting signs of third and fourth redundant binary digits after a radix point of said first intermediate divisor, and said second intermediate divisor being represented in the redundant binary notation including an integer portion of unity and at least three consecutive zeros immediately after its radix point;

fourth multiplying means for obtaining a second intermediate quotient represented in the redundant binary notation by multiplying said first intermediate quotient by said second multiplier;

f-th multiplying means, where f is an odd integer equal to or greater than five, for obtaining a third intermediate divisor by multiplying said second intermediate divisor by a third multiplier, said third multiplier being generated by said f-th multiplying means by extracting upper n digits from said second intermediate divisor having an integer portion of unity and m consecutive zeros immediately after its radix point, and by inverting signs of the redundant binary digits from an (m+1)-th place to (n−1)-th place after a radix point of said upper n digits extracted, where n is an integer equal to or greater than m+3 and equal to or less than 2m+1, and said third intermediate divisor being represented in the redundant binary notation including an integer portion of unity and (2m−1) consecutive zeros immediately after its radix point;

g-th multiplying means, where g is an even integer equal to or greater than six, for obtaining a third intermediate quotient represented in the redundant binary notation by multiplying said second intermediate quotient by said third multiplier;

h-th multiplying means, where h is an even integer equal to or greater than six, for obtaining an h-th intermediate quotient represented in the redundant binary notation by multiplying said third intermediate quotient by a fourth multiplier, said fourth multiplier being generated by said h-th multiplying means by extracting upper q digits from said third intermediate divisor having an integer portion of unity and p consecutive zeros immediately after its radix point, and by inverting signs of the redundant binary digits from a (p+1)-th place to (q−1)-th place of said upper q digits extracted, where q is equal to or greater than p+3 and equal to or less than 2p+1, wherein operations by said f-th multiplying means and said g-th multiplying means are iterated by a number of times needed to obtain said quotient with predetermined accuracy after operations by said first to fourth multiplying means, ending with an operation by said h-th multiplying means.

2. The divider as claimed in claim 1, further comprising a converter for converting said quotient represented in the redundant binary notation into a corresponding binary number to be output.

3. The divider as claimed in claim 1, wherein said controller inputs a plurality of upper bits of said divisor ($a_i$), and carries out the following computations to generate said first multiplier ($c_i$):

$(c_i)=(a_i)$: when $1 \leq (a_i) < 5/4$ $(c_i)=(3/4) \times (a_i)$: when $5/4 \leq (a_i) < 13/8$ $(c_i)=(1/2) \times (a_i)$: when $13/8 \leq (a_i) < 2$.

4. The divider as claimed in claim 1, wherein said first multiplying means obtains said first intermediate divisor by subtracting from said divisor a value generated by shifting said divisor by a number of times needed for generating said at least two consecutive zeros immediately after the radix point of said first intermediate divisor.

5. The divider as claimed in claim 1, wherein said controller inputs three bits of said divisor from a first place to a third place after the radix point, and outputs a signal commanding to set all bits of said divisor to zero, a signal commanding to shift said divisor toward a lower digit by one bit, and a signal commanding to shift said divisor toward the lower digit by two bits, and a signal indicating a value of a third place after the radix point of said first intermediate divisor represented in the redundant binary notation.

6. The divider as claimed in claim 1, wherein said first multiplying means comprises a shifter for carrying out in response to said control signal one of operations of setting all bits of said divisor to zero, shifting said divisor by one bit toward a lower digit, and shifting said divisor by two bits toward the lower digit, to generate a fourth and successive digits of said first intermediate divisor represented in the redundant binary notation in response to said divisor and an output of said shifter.

7. The divider as claimed in claim 1, wherein said second multiplying means comprises a shifter for carrying out in response to said control signal one of operations of setting all bits of said dividend to zero, shifting said dividend by one bit toward a lower digit, and shifting said dividend by two bits toward the lower digit, to generate said first intermediate quotient represented in the redundant binary notation in response to said dividend and an output of said shifter.

8. The divider as claimed in claim 1, wherein one of said third multiplying means and said f-th multiplying means comprises two code inverters for generating two redundant binary numbers by code inverting one of said first intermediate divisor and said second intermediate divisor, and two redundant binary adders for adding code inverted redundant binary numbers and the intermediate divisor to output a redundant binary number.

9. The divider as claimed in claim 8, wherein each said code inverter comprises multiplexers, each for selecting one of pairs of elements of each digit of said redundant binary number input to said code inverter in response to a control signal represented in the redundant binary number.

10. The divider as claimed in claim 8, wherein each said redundant binary adder comprises a plurality of adders, each of which adds a pair of corresponding digits of the two redundant binary numbers input to said redundant binary adder for outputting each digit of the output redundant binary number.

11. The divider as claimed in claim 1, wherein one of said fourth multiplying means and said g-th multiplying means comprises two code inverters for generating two redundant binary numbers by code inverting one of said first intermediate dividend and said second intermediate dividend, and two redundant binary adders for adding the two code inverted redundant binary numbers and the intermediate dividend to output a redundant binary number.

12. The divider as claimed in claim 11, wherein each said code inverter comprises multiplexers, each for selecting one of pairs of elements of each digit of said redundant binary number input to said code inverter in response to a control signal represented in the redundant binary number.

13. The divider as claimed in claim 11, wherein each said redundant binary adder comprises a plurality of adders, each of which adds a pair of corresponding digits of the two redundant binary numbers input to said redundant binary adder for outputting each digit of the output redundant binary number.

14. The divider as claimed in claim 1, wherein said dividend is one, and said divider outputs a reciprocal of said divisor as said quotient.

15. The divider as claimed in claim 1, wherein one of values (n−m−1) and (q−p−1) associated with the upper n digits of said second intermediate divisor and with the upper q digits of said third intermediate divisor, respectively, is set at $2^a - 1$, where a is a positive integer.

16. The divider as claimed in claim 1, further comprising a multiplexer for selecting one of said intermediate divisors and a corresponding multiplier, and for selecting subsequently an output of multiplying means for multiplying the selected intermediate divisor by the corresponding multiplier, and a multiplexer for selecting one of said intermediate quotients corresponding to said multiplier, and for selecting subsequently an output of multiplying means for multiplying the selected intermediate quotient by the corresponding multiplier.

17. The divider as claimed in claim 1, further comprising pipeline registers for temporarily storing a pair of said intermediate divisors and intermediate quotient, wherein said pipeline registers output said intermediate divisor and quotient which are temporarily stored in said pipeline registers to corresponding multiplying means under control of a clock signal.

18. A divider inputting a dividend and a divisor and outputting a quotient obtained by dividing said dividend by said divisor, said divisor having a value equal to or greater than one and less than two, said divider comprising:

memory means for inputting a bit sequence as an address input and for outputting a first multiplier, said bit sequence consisting of a predetermined number of upper digits of said divisor, said upper digits including or excluding a most significant digit of said divisor;

first multiplying means for obtaining a first intermediate divisor by multiplying said divisor by said first multiplier, said first intermediate divisor being represented in a redundant binary notation, and having an integer portion of unity and at least r consecutive zeros immediately after its radix point, where r is a positive integer;

second multiplying means for obtaining a first intermediate quotient represented in the redundant binary notation by multiplying said dividend by said first multiplier;

t-th multiplying means, where t is an odd number equal to or greater than three, for obtaining a second intermediate divisor by multiplying said first intermediate divisor by a second multiplier, said second multiplier being generated by said t-th multiplying means by extracting s upper digits from said first intermediate divisor, where s is equal to or greater than r+3 and equal to or less than 2r+1, and by inverting signs of redundant binary digits from (r+1)-th place to (s−1)-th place after a radix point of said first intermediate divisor, and said second intermediate divisor being represented in the redundant binary notation including an integer portion of unity and at least (2r−1) consecutive zeros immediately after its radix point;

u-th multiplying means, where u is an even number equal to or greater than four, for obtaining a second intermediate quotient represented in the redundancy binary notation by multiplying said first intermediate quotient by said second multiplier; and y-th multiplying means, where y is an even integer equal to or greater than four, for obtaining a quotient represented in the redundant binary number by multiplying said second intermediate divisor by a third multiplier, said third multiplier being generated by said y-th multiplying means by extracting upper w digits from said second intermediate divisor having an integer portion of unity and v consecutive zeros immediately after its radix point, and by inverting signs of the redundant binary digits from a (v+1)-th place to (w−1)-th place after a radix point of said upper w digits extracted, where w is an integer equal to or greater than v+3 and equal to or less than 2v+1;

wherein operations by said t-th multiplying means and said u-th multiplying means are iterated by a number of times needed to obtain said quotient with predetermined accuracy after operations by said first and second multiplying means, ending with an operation by said y-th multiplying means.

* * * * *